US011792068B2

(12) United States Patent
Pruitt et al.

(10) Patent No.: US 11,792,068 B2
(45) Date of Patent: Oct. 17, 2023

(54) METHOD FOR COMMUNICATING AND DEBUGGING ACROSS IOT SYSTEMS

(71) Applicant: Sensar Inc, Arvada, CO (US)

(72) Inventors: Ralph T. Pruitt, Arvada, CO (US); Gregory G. Richardson, Essex, MD (US); John C. Mickey, Edgewater, CO (US); Richard M. Powers, Lakewood, CO (US)

(73) Assignee: Sensar, Inc., Arvada, CO (US)

( * ) Notice: Subject to any disclaimer, the term of this patent is extended or adjusted under 35 U.S.C. 154(b) by 0 days.

(21) Appl. No.: 17/543,227

(22) Filed: Dec. 6, 2021

(65) Prior Publication Data

US 2022/0303174 A1    Sep. 22, 2022

Related U.S. Application Data

(63) Continuation of application No. 16/555,770, filed on Aug. 29, 2019, now Pat. No. 11,228,481.

(60) Provisional application No. 62/724,111, filed on Aug. 29, 2018.

(51) Int. Cl.
*H04L 41/0686* (2022.01)
*H04L 41/00* (2022.01)
*H04L 41/069* (2022.01)

(52) U.S. Cl.
CPC ........ *H04L 41/0686* (2013.01); *H04L 41/069* (2013.01); *H04L 41/20* (2013.01)

(58) Field of Classification Search
CPC ... H04L 41/0686; H04L 41/069; H04L 41/20; H04L 41/0672; H04L 43/50
See application file for complete search history.

(56) References Cited

U.S. PATENT DOCUMENTS

| | | |
|---|---|---|
| 7,203,926 B2 | 4/2007 | Bogle et al. |
| 9,367,415 B1 | 6/2016 | Lachwani |
| 9,652,364 B1 | 5/2017 | Kaila |
| 9,906,375 B1 | 2/2018 | Roquemore |
| 9,990,110 B1 | 6/2018 | Lounibos |
| 11,076,025 B1 * | 7/2021 | Volpe .................... H04L 43/106 |
| 11,159,416 B1 * | 10/2021 | Colwell ................. H04L 43/50 |
| 11,228,481 B2 * | 1/2022 | Pruitt .................. H04L 41/0686 |
| 2009/0063000 A1 | 3/2009 | Kodama et al. |
| 2010/0211270 A1 | 8/2010 | Chin et al. |
| 2016/0065653 A1 | 3/2016 | Chen et al. |
| 2016/0077910 A1 | 3/2016 | Dev |
| 2017/0168885 A1 | 6/2017 | Jain et al. |
| 2017/0277521 A1 * | 9/2017 | Sharma .................... G06F 8/40 |
| 2018/0089071 A1 | 3/2018 | Keskitalo |
| 2018/0205631 A1 * | 7/2018 | Chow .................. H04W 12/08 |
| 2019/0260818 A1 | 12/2019 | Mario, Jr. |

FOREIGN PATENT DOCUMENTS

WO    2010019045 A1    2/2010

* cited by examiner

*Primary Examiner* — Brian T O Connor
(74) *Attorney, Agent, or Firm* — Russell Manning, FisherBroyles, LLP

(57) ABSTRACT

Described herein are systems and methods for communication in an IoT system. The systems and method utilize a single grammar to communicate data from controller to sensor and points in between. In one embodiment, the systems and method are utilized in a debug mode, where the grammar is in a human-readable format. In a further embodiment, the human-readable grammar is a markup language, composed of tags and metadata.

17 Claims, 16 Drawing Sheets

METHOD FOR COMMUNICATING AND DEBUGGING ACROSS IOT SYSTEMS

CROSS REFERENCE

The present application is a continuation of U.S. patent application Ser. No. 16/555,770 filed Aug. 29, 2019, which claims the benefit of the filing date of U.S. Provisional Application No. 62/724,111 having a filing date of Aug. 29, 2018, the entire contents of both of which are incorporated herein by reference.

FIELD

The present disclosure relates to systems and methods for communicating in an Internet of Things (IoT) system. More specifically, the present disclosure is directed to utilizing a single grammar, preferably in human-readable format, to communicate data across multiple components in an IoT network. Use of the human-readable communication format has particular applications in debugging an IoT system.

BACKGROUND

The Internet of Things (IoT) is becoming an increasingly popular tool for collection of data from smart devices (i.e., IoT-enabled devices or sensors) that may be spread across a wide geographic area. Typically, IoT-enabled devices transmit data from the field (e.g., smart device or sensor) to a control unit (e.g., backend), which analyzes the data to schedule activities, deploy assets, or optimize parameters such as energy consumption or cost of field operations. An IoT network may contain tens, hundreds, thousands, or even millions of sensors, sometimes scattered geographically over the entire globe.

One of the most significant challenges in deploying and maintaining IoT networks is the diversity of both sensors and environments that must be supported. Batteries may drain quickly in some deployments and slowly in others; bandwidth capabilities may change as a device moves; or a previous generation of sensors may have to be replaced with new sensors that were never contemplated in the original network design.

Tens if not hundreds of thousands of different "IoT device" designs—different sensors, microprocessors, communications systems, from different manufacturers—are expected to be created and deployed in the coming decades. Unlike previous generations of devices, IoT systems are typically battery-powered and extremely compact, and therefore strong consideration much be given to minimizing memory use, computing resources, and electrical power. To design optimally for a given device often requires writing code for embedded systems design that is customized for the specific microprocessor. However, embedded hardware design and integration is, in the present state of the art, typically much less scalable than conventional computer networking. Subsystems and components are purchased off-the-shelf and knitted together, which in turn creates a numerous design interfaces (e.g., communication protocols) for system integration—from embedded systems to RF protocols, firmware to software, device output protocols to backend ingest protocols, etc. That is, different interfaces exist between different modules (e.g., sensors, gateways etc.).

One the biggest challenges of IoT development is not device performance, but the debug process that must happen when an IoT system is tested in laboratory or in a real environment. During this debug process, it may not be clear what module of the system is misbehaving, and when data is corrupted it can be difficult to isolate the source. When the modules pass data back and forth using their own optimized protocols—for example, native BLE—it is difficult for a human to parse whether a module has somehow passed corrupt data or instructions.

In the present state of art, debugging must be done by unit testing each such interface, which in turn requires specialized tools and methods for each such unit test. Further, as each design interface may use different protocols, debugging may require domain-specific knowledge of separate engineers (e.g., embedded code engineers, network architecture engineers, etc.). With all these potential points of failure, it is very difficult to lay out an end-to end architecture at the beginning of system design and have any confidence it will survive the unit testing process. Accordingly, any system optimization is likely to require independently redesigning multiple interfaces.

One very recent solution for managing diverse networks such as (but not limited to) IoT is to build a software-defined network (SDN). In SDN, the forwarding process of network packets (the Data Plane) is disassociated from the routing process (the Control Plane). Intelligence on such a network is centralized, and the network can be reconfigured on the fly by issuing software updates to any point along the communications chain. As an example, a weather system may be able to increase the resolution of wind measurements for sensors experiencing a weather event in one city, while lowering the resolution of measurements for sensors in another, calmer climate. Such flexibility allows performance (in this case, resolution) and cost (in this case, energy consumption) to be optimized by the central controller based on its own internal algorithms, which can of course also be updated. An SDN is thus an exceptionally flexible system, ideally suited in many ways to the needs of IoT.

While SDNs built around the unique constraints of IoT have been described in principle by academic labs, solutions tend to focus on the development of specific optimization algorithms, such as dynamically optimizing energy versus bandwidth consumption. Such emphasis is needed to create tools that enable a more resilient, dynamic network. But this intellectual exploration of the power of flexibility to optimize performance has led to an unexpected problem: a system that is too flexible and too optimal cannot be easily debugged. Algorithms are an effective solution until they malfunction unexpectedly. And without humans in the loop, it is often impossible to understand how to fix such failures.

Debug problems are one of the most significant practical issue in fielding IoT systems today. Sensors are, by their nature, being placed into poorly controlled environments with shifting needs, and will inevitably run down, fall out of contact, or otherwise break. To field an IoT system means to provide engineering support, and that in turn means to troubleshoot unexpected failures. The diversity of the real world can never be tested in a lab, so the pain of trial and error becomes a critical component of any functioning IoT network. Often, debugging becomes the slowest and most costly part of IoT system deployment.

What is needed is a practical IoT communication solution, that embraces some of the flexibility of SDN, yet explicitly includes the possibility of humans as elements in the IoT operating chain, to make both programming and debug facile enough to become part of the network's natural controls system.

SUMMARY

Provided herein are systems and methods (i.e., utilities) for use in IoT communications. The utilities use a common or single grammar to communicate data in an IoT system from a controller (e.g., backend controller) to a sensor and back, as well as points in between. In an arrangement, the grammar is in a human-readable format. In such an arrangement, the human-readable grammar is a markup language, composed of tags and metadata.

In an aspect, a system and method utilizing a common language between components in an Internet of Things (IoT) system is utilized to facilitate debugging of the system. In an arrangement, the IoT system includes sensor devices, receivers or gateways and a storage system (e.g., backend), which may further include data processors and/or controllers. The system and method are directed to acquiring output from a first sensor device and encapsulating the output from the sensor device in a markup language having human readable tags and data to define encapsulated data. This encapsulated data is then sent from the sensor device to a receiver via wireless connection. The encapsulated data may be communicated utilizing various communication protocols. In addition to sending the encapsulated data to the receiver, the sensor device generates a first log file of the encapsulated data as it was sent to the receiver. The first log file may be stored locally on the sensor device or output to a local device, which may forward the first log file by any appropriate means. The receiver receives the encapsulated data via the wireless connection and generates a second log file of the encapsulated data. Preferably both log files are in the form of human readable markup language. Accordingly, the first and second log files may be compared to determine if differences exist between the first log file and the second log file. As the log files are in human readable form, such comparison may be readily performed by an engineer or other technician. That is, an engineer or technician may simply read the log files. Alternatively, log files may be compared in an automated procedure.

In a further arrangement, the receiver may communicate the encapsulated data it receives to the storage system by another communications protocol (e.g., cellular, Wi-Fi, ethernet etc.). Accordingly, the storage system or its related components may generate at least a third log file in the markup language. Accordingly, the first second and third log files, and potentially additional log files (e.g., between modules in the backend system) may be compared to identify if differences exist therebetween. If one of the log files is different than the other log files, this may provide an indication of an error within the system which may be isolated and addressed.

In an arrangement, the communications between the sensor device, the receiver and the backend are performed as serial data transfers. Such serial data transfers ensure that the data is sent in a continuous stream which may be monitored in real time by an engineer technician. As the serial data transmission is in the human readable form, such an engineer or technician may read the serial data transmission as it occurs. If the human readable tags are decipherable, it may be presumed that the data transfer is in a proper format. If the data transmission is undecipherable to an observing engineer or technician, this may indicate an error within the system. In various arrangement, the use of serial data transfers may require forcing various data communications protocols to operate in a serial transfer mode.

In an aspect, a wireless communication system and method is provided having three or more pieces of hardware devices that are physically separated. Two or more of the hardware devices communicate via wireless communications and connections between different pairs of the hardware devices may utilize different communication protocols.

In an arrangement, the communications between each hardware device are forced serial communications. In such an arrangement, the hardware devices may communicate using a common language. In an arrangement, the common language is a mark-up language that include tags or labels and encapsulated data and/or commands. The mark-up language may be in human readable form. Each hardware device may have device specific instruction, for example, in the form of a Software Developer's Kit (SDK), that translates information from the mark-up language to a naïve hardware language of the device. This allows each device to interpret and, if necessary, carry out instructions provided in the common markup language used for communication in the system.

In one arrangement, the first hardware device includes a first SDK where the first SDK translates information from the markup language to a first native hardware language of the first hardware device. A second hardware device includes a second SDK, wherein the second SDK translates information from a markup language structure to a second native hardware language of the second hardware device. In one arrangement, the first hardware device is a sensor that communicates data elements to the second hardware device encoded in the markup language. In an arrangement, the communication of at least one data element from the first hardware device to the second hardware device is modified by an instruction sent by the second hardware device.

In a further aspect, communications between the hardware devices is done in serial data communications. In such an aspect, the serial communications may be performed via a communications protocol that permits parallel or packetized data transfer. To effect serial transfer over such a communications protocol, a first hardware device (e.g., sensor) may broadcasting at least a first data element from the sensor (e.g., in the form of tagged and encapsulated data). The sensor may enter into a listen mode for a defined delay period. The sensor may then receive a first confirmation associated with the first broadcast upon which the sensor may broadcast a second confirmation and then send a data element or frame, which may be in encapsulated form. The process provides a handshake and confirmation allowing the sensor device to, for example, specify a single channel upon which data is sent serially.

In another aspect, a system and method are provided for communicating information through an IoT network. The IoT network includes a communication network having at least a sensor, a receiver or gateway, a storage system, and a controller, (e.g., network components) where at least the sensor is not directly electrically connected to the controller. A human-readable grammar is used to pass information between components of the network, for at least a first period of time and a machine-readable grammar is used to pass information between components of the network, for at least a second period of time. Based on instructions provided by one of the network components, the components may switch between the human readable grammar and the machine-readable grammar. In an arrangement, the human readable grammar is used in a debug mode, wherein communications may be logged in the human readable grammar at some or all of the components.

DETAILED DESCRIPTION

Figure 1:
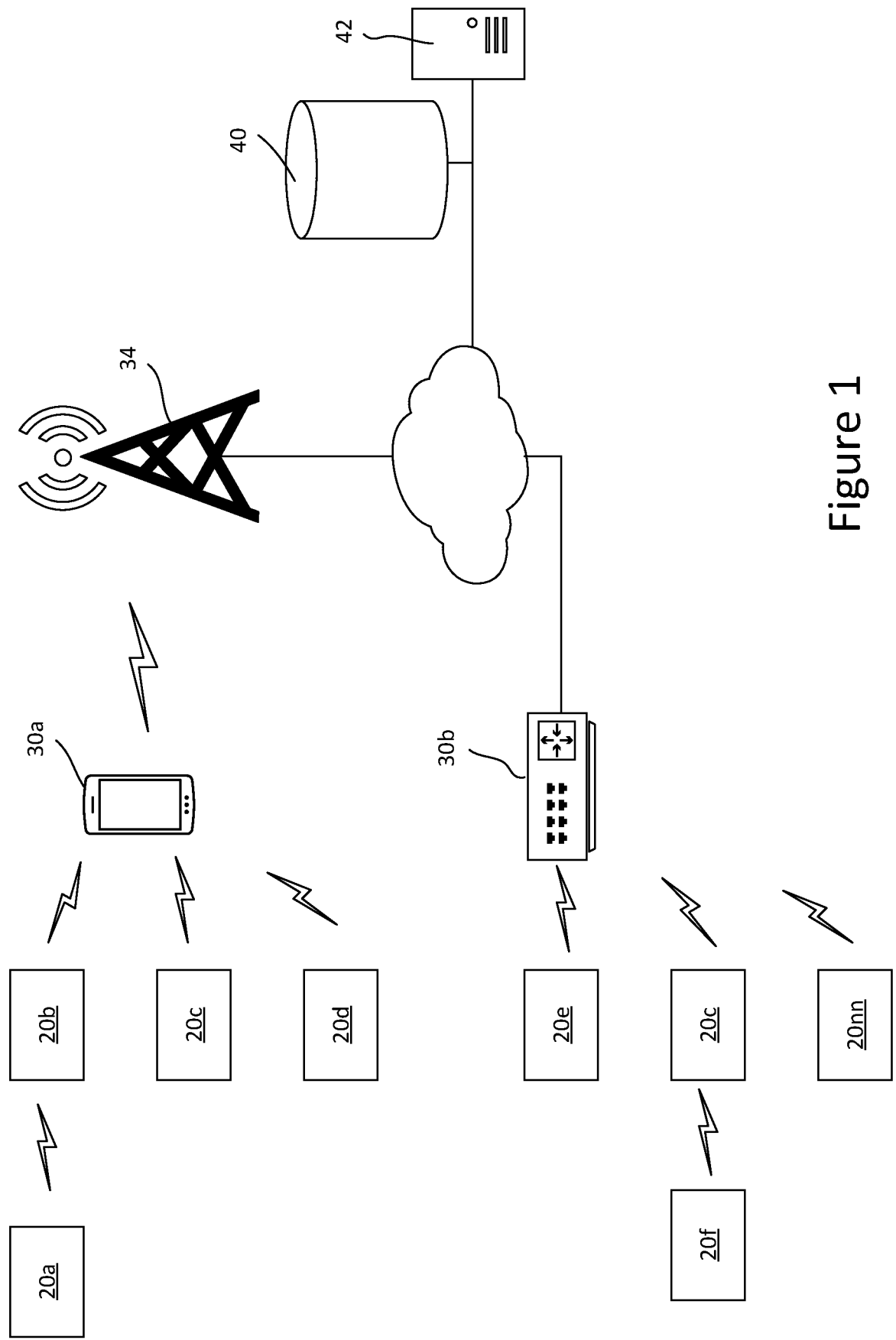
FIG. 1 illustrates one embodiment of an IoT system.

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

As presented herein, a common or single grammar is utilized to communicate data in an IoT system, preferably, from a controller (e.g., backend controller) to a sensor and back, as well as points in between. However, in various embodiments, such a common grammar may be used for communication between less than all components of the system. In an embodiment, the grammar is in a human-readable format. In a further embodiment, the human-readable grammar is a markup language, composed of tags and metadata. In a specific embodiment, use of such a human-readable format facilitates debugging of an IoT system.

The human-readable format, for example, in the form of tags and metadata, is preferably used by all participating components in an IoT network. In this arrangement, metadata itself (e.g., sensor readings such as temperature readings) can still be represented using machine code such as numeric or hexadecimal values. However, human readable tags clarify what information or instruction is associated with the metadata. In one example, human-readable tags comprise commands, headers, labels, and the like that are represented with ASCII characters. ASCII-encoded information can be recognized and remembered easily by engineers of any discipline and rely on less domain-specific knowledge to parse. By ensuring consistent application of human-readable code across the network, engineers with different responsibilities (e.g., embedded code, network architecture, etc.) are able to observe system operation expressed with a consistent, human-understandable grammar. This dramatically reduces the time needed to collaborate to build or debug an IoT network.

The use of tags and metadata is a form of markup language that was originally a system for annotating a document. Of particular interest to the presented utilities are descriptive markup languages, which label parts of the document but inherently provide no specific instructions as to how they should be processed. Well-known examples of descriptive markup languages include LaTeX, HTML, and XML. The objective of each is to decouple the inherent structure of the document from any particular treatment or rendition of it. Because markup languages, and more generally data description languages (not necessarily textual markup), are not programming languages (they are data without instructions), they are more flexible and easily manipulated than programming languages.

The abbreviation IoTML (i.e., IoT Meta/Markup Language) is used to refer to a language, grammar, method, or system in accordance with the present disclosure. In a preferred embodiment, IoTML is any markup language, which when paired with the appropriate parts of a Software Developer's Kit (SDK), a set of SDKs, a board support package (BSP) or other interface (i.e., which enables the device to be conversant in the IoTML communications protocol) may be used to communicate between different devices. SDKs and BSPs include documentation, application programming interfaces (APIs), code, libraries and processes, as well as guides that developers can use and integrate into their apps. Hereafter, the appropriate parts of an SDK, BSP or another interface is referred to generally as stored logic or an SDK. A data transmission in this markup language may include a set of commands, individual data elements, and/or an indication that communication is complete, or received.

By integrating a markup language using the methods of this disclosure, the cost (e.g., data and energy) of each individual transmission is increased as more data is transmitted with each broadcast, but, as search-sort bottlenecks are eliminated power can be optimized for the system as a whole. Use of a markup language also speeds development and deployment of IoT systems. By ignoring the common IoT teaching that the cost of a single broadcast should be minimized, these other problems are directly solved, offering systems-level improvements in quality and consumption. That is, by optimizing other functional attributes, such as reducing the computational burden of search/sort, the inventors have found the presented utilities improve the performance of the IoT system as a whole. For example, explicitly labeling data removes the requirement that all characteristics be updated with each cycle, decreasing the communications burden associated with characteristics that require less frequent updating. The use of tags and metadata (and data description languages in general), with associated software developer's kits (SDKs) or other interface, frees the developer from the need to optimize coding around a specific communications protocol such as BLE, and thereby allows code to be made instantly compatible from one protocol to the next, with no recoding required.

Typically, a common "tag and encapsulate data" markup language is applied for a plurality of the central functions of the IoT Command, Control, Communications, and Intelligence (C3I) chain. A prototypical C3I chain might be thought of as composed of a linked group of pairs, for example:

1) Environment->Sensor+Output Hardware
2) Sensor Hardware->Sensor Firmware
3) Firmware->Embedded Comms (BLE+Wifi+other)
4) Embedded Comms->Scale Comms (Satellite+Cellular+Internet)

5) Scale Comms->Ingest+Real-time Analytics+Storage
6) Storage->Analytics+scale C3I engine(s)

Typically, an IoT C3I chain is conceptualized in three groupings: #1-3 (embedded systems), #4-5 (comms and storage), and #6 (backend system), where each grouping comprises a separate area of expertise, and the mostly independent designs are bridged by interface specifications across the three groups. However, because IoT systems comprise an ever-changing collection of physical components and physical environment, the hand-off between each grouping are rarely static over time. This can slow systems integration, due to the need to debug both across each individual interface as well as across the entire design when any system is upgraded or any environment changes.

The inventors have recognized that if a common language is "spoken" and commonly formatted sets of transmitted data are passed, not just across individual interfaces but from the sensor firmware all the way to the backend (and back), then several important design and system integration improvements emerge. First, debugging across interfaces is much faster and easier, because the experts on either side of all the interfaces are debugging using the exact same language, codeset, and sets of transmitted data (e.g. logs), rather than debugging to meet an individual interface specification. Second, subsection designs become portable in that a fully debugged element of the chain can be used with confidence in similar designs. This is different than the result of a typical industry standard, in that the interface of this invention is effectively a software module rather than a written standard, and thus can be tweaked and revised at a later time at the user's discretion. Third, if the language is a form of markup language with defined data formats (such a tags and data as used in HTML or XML), then it can serve as a bridge between elements of an end-to-end system. Software developer's kits (SDKs) are one way to bridge between IoTML and protocols, stacks, drivers, and/or native (or other) device languages.

In an embodiment, a single language, mediated through a series of SDKs or similar interfaces, can be used for communication end-to-end through the system, or through a subset of components or nodes of the system. The use of a single, universal language imposes a performance penalty, as an SDK or similar interface must be used at each MCU or CPU in the network, and this added translation comes with a computational cost. That is, an SDK or similar interface must be provided to convert the human-readable data and instructions to machine language on each local device. The inventors have surprisingly found that this penalty can be kept relatively small relative to the performance gains made through flexibility in defining the network, especially through a faster debug cycle. The inventors have found that in a preferred embodiment, the single markup language is kept relatively terse in the normal activity mode, but is converted into a more verbose, human-readable format in a debug mode. This configuration minimizes the bandwidth cost of markup instructions during automated operation but maintains the ease of debug by presenting human engineers with human-readable code.

FIG. 1 illustrates one non-limiting, exemplary IoT system 10. The system 10 consists of three primary elements sensors 20a-nn (hereafter 20 unless specifically referenced), receivers 30a-30b (hereafter 30 unless specifically referenced) and a database 40, which may be either local or accessed via the cloud 50. The database 40 may further include an analytics system/server 42 (hereafter controller 42). For purposes of discussion herein, the sensors 20 are temperature sensors. As shown, a first set of the sensors 20a-d communicate with a first receiver 30a (e.g., mobile smart device) which communicates to the database 40 through the cloud 50 via cellular communications. A second set of the sensors 20e-20nn communicate with a second receiver 30b (e.g., router), which communicates with the database 40 through the cloud via, for example, an ethernet connection. In some arrangement, one or more sensors may communicate with one another. In the illustrated embodiment, data from the sensors 20 is accumulated at the database 40 for subsequent analysis. Further, the controller 42 may be configured to send instructions back down to the receiver(s) 30 and sensor(s) 20.

Communications between various nodes in the system may be by different protocols. For instance, transport protocols include Bluetooth Low Energy (BLE), which is an RF communications scheme optimized for relatively low transmission rates at low power over 100-meter air gaps. Example specifications include 1 Mbit/s, 10 mW max, 2400 GHz ISM band. Such a protocol may be utilized between sensors and/or between the sensors and the receivers. LTE is a high-speed wireless communication for mobile devices and data terminals, based on the GSM/EDGE and UMTS/HSPA technologies, among others, optimized for high transmission rates over 5-30-kilometer air gaps; example specifications include: 299.6 Mbit/s and upload rates up to 75.4 Mbit/s, 20-69 W bands from 600 MHz to 2600 MHz. Such a protocol may be utilized between the first receiver 30a and a cell tower 34. IPv4 is a connectionless protocol for use on packet-switched networks in use from 1982 onwards. Such a protocol may be utilized between the second receiver 30b and the internet/database. Further, the cell system may utilize one or more protocols to translate received RF communications (e.g., LTE) for transmission to the internet/cloud. Other protocols are possible.

Figure 2:
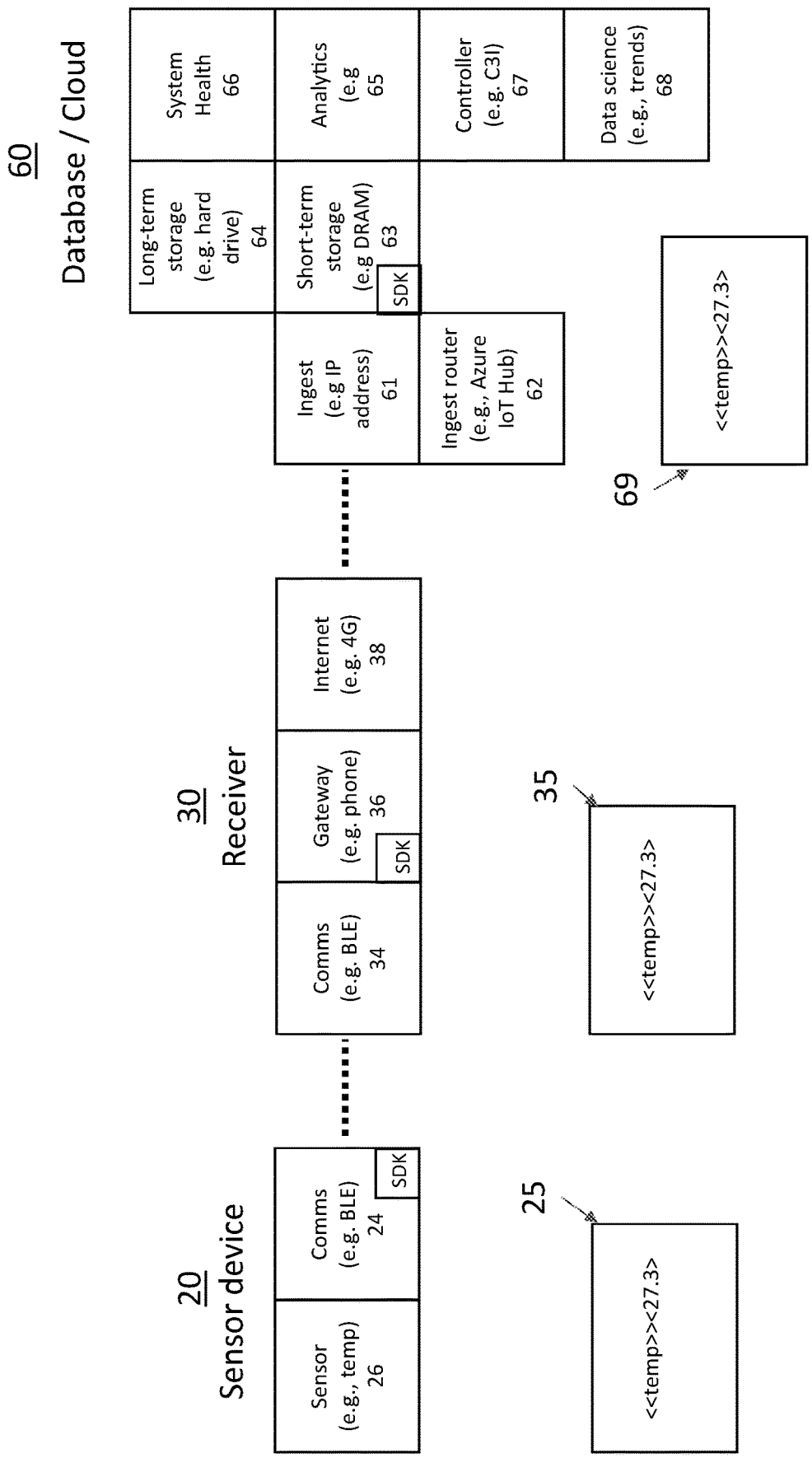
FIG. 2 illustrates a more detailed embodiment of a portion of the IoT system.

FIG. 2 shows a portion of the IoT system to illustrate a single sensor 20, a single receiver 30 and the database and cloud. In the present illustration, the database and cloud are combined and referred to as the cloud system 60. As illustrated the sensor 20, receiver 30, and cloud system 60 are physically distinct from each other and separated in space, so that any communication takes place wirelessly or over at least one wireless connection between each node. As illustrated the cloud system 60 includes various modules such as a short-term data storage module 63 and a controller module 67, which each may include additional components or modules. The cloud system 60 may have additional modules, such as ingest module 61; an ingest router module 62; a long-term memory module 64; an analytics module 65; a system health module 66; and a data science module 68. A module may be defined here as any component which sends or receives information from another component, and which has to translate from its native code to another language to send or receive data and/or execute instructions. Such modules may be defined in hardware, software and/or firmware. In one example, each of the modules in the system includes discrete translators or SDK. Any time a component has to frame its data into a new language, the component is communicating with another component, and thus the two components constitute separate modules. In some embodiments, these modules may be established on physically separate computers, though this is not necessary.

As illustrated, communications between various nodes and or modules in the system may utilize various different protocols. As previously noted, such different protocols associated with different nodes may require domain-specific knowledge of separate engineers or network technicians to assemble and operate the system 10. Further, if a problem arises in the system, difficulties arise in identifying the source of a problem due to the multi-domain information that must be assessed. In order to assess where a problem lies in the IoT network, log files may be generated for each node and compared. As each module may utilize different protocols, comparison is performed in different protocol languages.

In accordance with the present disclosure, information passing between modules is passed using a uniform grammar having human-readable tags and metadata. The use of tags and metadata and/or human-readable code is generally taught against in the literature for IoT systems, because this adds overhead that will both consume energy and slow operations. However, the inventors have found that the biggest challenges of IoT development are not device performance, but the debug process that must happen when an IoT system is tested in laboratory, or in a real environment. During this debug process, it may not be clear what module of the system is misbehaving, and when data is corrupted it can be difficult to isolate the source. When the modules pass data back and forth using their own optimized protocols—for example, native BLE—it is difficult for a human to parse whether a module has somehow passed corrupt data or instructions. By using a human-readable format, the ambiguity around information transfer is removed, as well as the need for each individual debug engineer to interpret for his or her specialty. All the members of the development environment will have the ability to bring their perspective to the problem because they will have access to the data.

In one embodiment, the entire system passes information such that any communication between modules is done using the human-readable format. In some embodiments, the human-readable code is used between two or more modules, but not between every module in the system. In some embodiments, the human-readable code is used between three or more modules, thereby crossing two or more interfaces. The use of a single, universal human-readable language imposes a performance penalty, as an SDK or similar interface must be used at each MCU or CPU (e.g., node or module) in the network. Such an SDK can take the form of a simple implementation of one or more application programming interfaces (APIs), in the form of on-device libraries to interface to a particular programming language, or it may entail hardware-specific tools that can communicate with a particular embedded system.

In one embodiment, an SDK is used to convert the human-readable data and instructions to machine language on a local device. In an embodiment, the SDK itself can be updated, for example to include new types of commands or grammars that were not previously part of the instruction set. In an embodiment, the SDK comprises protocols for execution of at least the following six classes of actions: how to speak in a human-readable grammar and translate between human- and native grammars (e.g., machine languages); how to rewrite the base code (methods for installing an update); how to connect to other devices (wireless connection protocols, such as BLE); standard configurations (e.g., look-up tables associated with varying states, so that a device may alter its mode of operation without the base code having to be rewritten); how to deal with requests from other components of the system; and what to do if a connection is lost.

For each link layer or module-to-module interface, such as a BLE transmission channel, code must define how the channel can be controlled/configured/commanded by IoTML as well as how to transmit IoTML data structures across the channel. If a given BLE module, or System on a Chip (SoC), or System on a Module (SoM) is to be implemented, it may be that the BLE module is controlled (Network Co-Processor (NCP)-style), or that an MCU directly operates the BLE chip. If the system is NCP, then there will be two SDKs providing tools for 1) the module to meet the IoTML requirements and 2) for the MCU to control the BLE module such that it transmits IoTML compliant data. If the system is a module with an MCU and BLE chip, then a single SDK may handle both controlling the BLE chip and making/sending IoTML compliant messages across the interface.

Figure 3A:
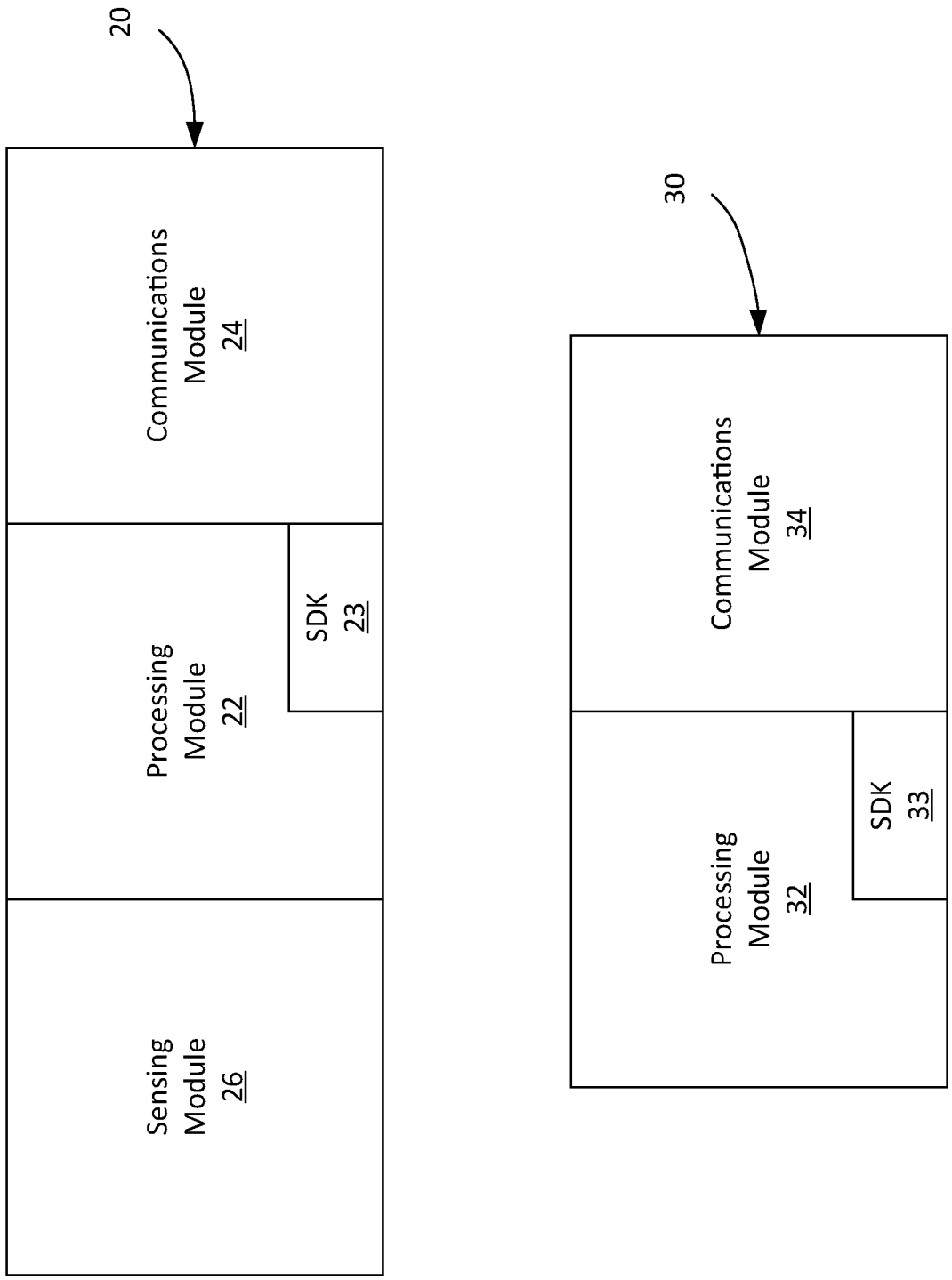
FIGS. 3A and 3B illustrate two embodiments of sensors and receivers in the IoT system.

An exemplary construction of a sensor device 20 and receiver 30 are illustrated in FIG. 3A. In the illustrated embodiment, the receiver 30 includes at least a processing module 32 and a communications module 34. The sensor device 20 contains a processing module 22, a communications module 24 and a sensing module 26 (e.g., temperature sensor module). As illustrated, the sensor device 20 is remote from the receiver 30 requiring wireless communications. Each of the processing modules 22, 34 includes an SDK 23, 33, respectively, which translates between the IoTML markup language and a native hardware language, OS, or other component language, wherein both the sensor and receiver are configured with separate device specific SDKs. For instance, the SDK 23 of the sensor device may take an output of the sensing module 26, which is typically in a machine-readable format, and embed the output (e.g., data) in a human-readable mark-up language having tags and labels. That is, the SDK 23 of the processing module may define how to convert the data to tags and metadata. The SDK 33 of the receiver processing module 32 may define how to convert the tags and metadata to a machine-readable format of the receiver.

Figure 3B:
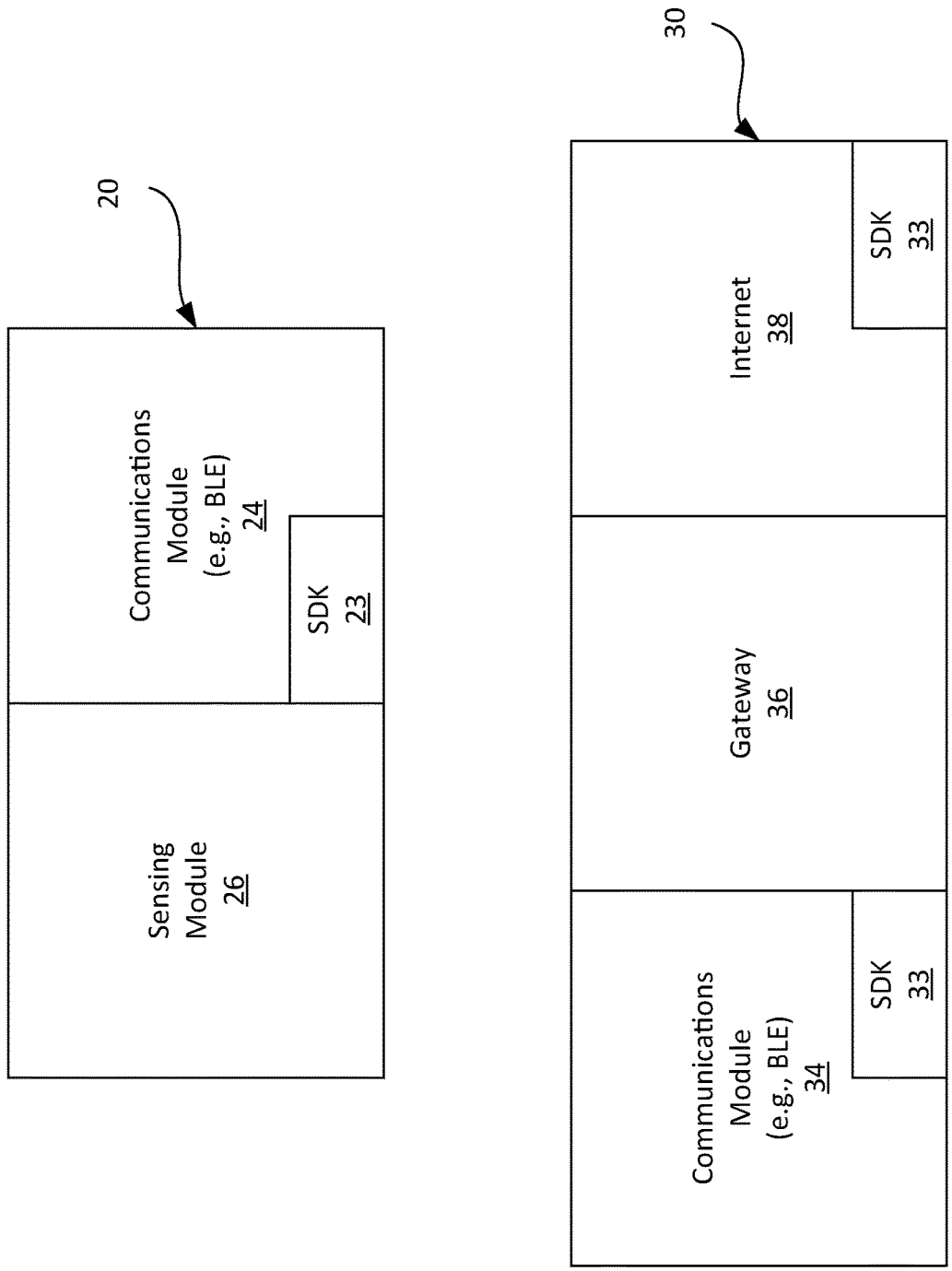

In a further embodiment shown in FIG. 3B, the receiver 30 includes three modules: a communications module 34 for communicating with the sensor 30 using a technology such as BLE, a gateway module 36 that translates BLE information into data that can be passed towards the cloud, and a second communications module 38 for sending data onto the internet. In some embodiments, the gateway may form or drop connections without receiving instructions from the internet. In this embodiment, the sensor 20 can be divided into two modules, a sensor module 26 and a communications module 24, which communicates to the receiver using a protocol such as BLE, LTE, IPv4, IPv6, etc.

In either embodiment, the sensor 20 may output a reading in a mark-up language. In one exemplary embodiment, the sensor 20 is a road conditions sensor (e.g., including a temperature sensor) that communicates the monitored condition wirelessly to the receiver 30 using the IoTML markup language. In this embodiment, the sensing module 26 may output a monitored temperature (e.g., 27.3 Celsius). The SDK 23 may convert this monitored temperature into a human readable form with tags and labels:

<<temp>><27.3>

That is, the data may be tagged and encapsulated, which entails labeling a data element with a header (and optionally a trailer; not shown). This information may be stored to a log file 25 at the sensor or output to a testing device (e.g., attached to the sensor in lab testing or in the field). See, e.g., FIG. 2. The communications module 24 of the sensor device 20 sends the tagged and labeled data to the receiver. As further discussed herein, the communication module may further include an SDK that controls the operation of the data transfer. The receiver 30 receives this information and an SDK of the receiver may format the received information according to predefined rules and output this information to a log file 35. See. e.g., FIG. 2. That is, the receiver SDK, which may be contained within the software of the receiver 30 is configured to output the received data in a predetermined form, which, absent errors, should be in the same form in which it is received. The receiver may send this information to the cloud system 60, where one or more module specific SDKs may generate a log 69 of the received information. If all the logs show the same information (e.g., <<temp>><27.3>), which can be compared by an engineer of any discipline as the log is in human-readable form (e.g., mark-up language with tags and data), there is no error in the system. If, for example, the receiver log 35 is different (e.g., <<temp>><81.1>) than the sensor log 25, and the cloud system log 69 matches the receiver log (e.g., <<temp>><81.1>), a problem exists in the interface between the sensor 20 and the receiver 30 and/or in the receiver software. In this example, the receiver software is converting the temperature from Celsius to Fahrenheit, prior to transmitting the data. In such an arrangement, any engineer in a debugging team can isolate the location of the bug, though an engineer with domain-specific knowledge may be required to fix the problem.

In applications where the sensor is deployed to the field, a situation may arise where the sensor log is not readily available. In such and instance, the remainder of the logs in the system may be compared and, if the remainder of the logs are identical, it may be inferred that a problem originates with the sensor and a technician may be deployed to the sensor location for further testing. Such an arrangement may reduce the number of field calls required to debug a deployed IoT system.

While the above represents a simplified version of the debugging system utilizing a common human readable mark-up language, it has been recognized that, in implementation, additional difficulties may arise. Specifically, the way that various modules prepare and send data can affect the integrity of the communications and/or the usefulness of the communications during debugging. In the former regard, for example, the exemplary sensor 20 and receiver 30 of FIG. 3B may both utilize a Bluetooth Low Energy (BLE) communication module. While BLE is utilized on both devices, each BLE system is configured specifically for its given device and variations can exist between the BLE systems. That is, BLE systems are configured for specific operating system and if the receiver is, for example, an Android device, the BLE system is configured for Android devices (e.g., BlueDroid). Conversely, the BLE system utilized on firmware (e.g., integrated into the sensor) may have different configurations. By way of example, the different BLE systems may utilize different ASCII sets. Further, BLE uses parallel registers where data is broken into separate registers, sent in parallel (e.g., multiple channels) and reassembled by the receiving device. Accordingly, what the receiver outputs after reassembling data sent may be in a slightly different form. Slight differences between the BLE systems can result in minor alterations between information that is sent and information that is reassembled (e.g., using different ASCII sets).

Another concern is the usefulness of the communications during debugging. Many, if not most, communication protocols of the IoT system utilize parallel channels to send data. That is, transmitted data may be broken into multiple pieces (e.g., packets), sent on different channels and subsequently reassembled by a receiving device. Typically, this results in efficient data transfer. However, parallel transmission limits the usefulness of the human-readable and encapsulated data for debugging purposes. As may be appreciated, during debugging, data transmissions across interfaces may be monitored in real-time. Accordingly, data transmission in a human readable mark-up language may be monitored by an engineer or other technician. That is, the engineer may read the transmission in real-time as they occur. If the transmission includes legible/readable tags, headers, trailer and/or labels, the data transmission may be considered valid. Conversely, if the data transmission is undecipherable, it may be presumed that an error has occurred. However, the ability to monitor such transmission in real-time requires that the transmissions occur on a single channel such that the tags, labels, data etc. are in order. That is, if the transmission is broken into pieces and transmitted on separate/parallel channels, an engineer/technician cannot decipher the data. Accordingly, it is desirable to transmit the data on a single channel.

To address these problems, one embodiment of the present disclosure utilizes serial communications between at least a portion of the components/modules of the IoT system. That is, communications between modules of the system are in the form of a serial communications protocol that transfers data/instructions with tags and encapsulated data on a single channel. In an embodiment, the instructions are written in the form of a markup language. In a preferred embodiment, the markup language comprises tags and data, for example in an XML-like format. Further, modules are forced to communicate in serial (e.g., on a single channel) to ensure that data strings (e.g., encapsulated data in markup language) remain in order. By way of example, the receiver 30 of FIG. 3B receives data on a single channel of the BLE communication device 34 such data may be monitored for debugging. However, it will be appreciated that the communications between the IoT devices may permit operations other than debugging including, for example, end-to-end control of the IoT system.

The following illustrates one embodiment of instructions and/or data written in the form of a markup language including tags and data, for example, in an XML-like format. Data transmissions in such a markup language may comprise a set of commands, individual data elements, and/or an indication that communication is complete, or received. As used herein, a discrete set of elements sent in a single transmission cycle is herein referred to as a 'frame'. In one embodiment, the last element of a frame is a marker delineating the end of transmission. If the termination marker delineates the end of a device (e.g., sensor device) transmission, it is designated a TICK. If the termination marker delineates confirmation of reception from a receiver, it is designated a TACK. The communications protocol, which is suitable for use over the "Cable Replacement Protocol" of BLE, is described below. However, it will be appreciated that the communication protocol is not limited to BLE.

As described above, the addition of tags and markers such as TICK and TACK adds substantial overhead to IoT data transmissions. However, the inventors have found that adding markers such as those that define and beginning and end of transmission, or a confirmation of transmission, has the salutary effect of lowering energy costs, improving stability, and/or improving the portability and reducing the complexity of code and/or debugging.

Communications are typically between a plurality of devices, which may include a sensor(s) and receiver(s) (e.g., a mobile phone or docking station). Communication may occur directly between a sensor device and receiving device, or for example, via a "bucket brigade", sent from sensor to sensor before being finally transferred to a receiver. The receiver may in some embodiments be in communication with a database to store sensor data. In some embodiments, that database may be physically remote or "in the cloud."

Non-limiting examples of how data is tagged and encapsulated are represented below. Without limitation, encapsulating comprises labeling a data element with a header (and optional trailer), and tagging comprises adding an identifier to the data element. In one embodiment, a status message may be sent from a sensor device to receiver using a format such as follows:

<STATUS>

A set of sensor readings may be sent encapsulated in a frame, which allows the device to determine how many data elements need to be sent at once:

<FRM><TICK><data1><data2><data3> . . . </FRM>

This technique gives flexibility in data handling, for example allowing a device to avoid sending null sets for data elements collected infrequently while updating elements that require high frequency. By sending data elements as a frame, each sensor device may be handled independently, which may optimize the power consumption, error rate and/or resolution of the system. Despite the increased overhead of the <FRM> and <TICK> labels, the communications system as a whole may use overall less power and/or achieve greater overall stability than can be achieved without the use of labels.

In some embodiments, a TICK message is associated with each frame and represents an instruction to the receiver to confirm receipt with a TACK once the frame is parsed. A TICK message may further contain information such as a device ID, a timestamp, etc. By way of example, the TICK format may appear as:

<TICK>105789346357</TICK>

The data elements themselves are defined similarly to a frame, with a beginning and ending. For example, the element:

<U0175>75.5</U0175> may represent a temperature reading in Fahrenheit, where the code U0175 represents an arbitrary designation for a specific class of data element, and the 75.5 represents the measurement associated with that class. In another example, the data element may be represented as:

<U000C>cb00e5008600</U000C> describes a reading from, for example, an RGB sensor, where the code U000C refers to the type of sensor, and the cb00e5008600 represents its current value, in hexadecimal code.

The receiver communicates using the same formatting style, for example sending a set of commands (e.g., <CMD>) containing instructions to a device to, for example, run a self-diagnostic check:

<TACK><CMD><instruction1><instruction2>. . . </CMD></TACK>

Where instruction1, instruction2, etc. refer to different elements of the device to be checked. The instructions themselves may be customized for the device, and trigger access to a library (e.g., translation SDK) that converts the instructions into device-specific firmware code for execution. In some embodiments, the code is made available to the device by a boot loader or software development kit (SDK) or board support package (BSP), which enables the device to be conversant in this communications protocol from the moment it is turned on. In some embodiments, the boot loader is activated during the assemble-ship process at a manufacturer, and the device may be commanded to run a self-test and report results while still on the production line.

In one example, the receiver might issue a command to the device to perform a soft reset, resetting all hardware including the CPU. Such a command might appear as follows:

<TACK><CMD>TR?</CMD></TACK> or alternatively:

<TACK>TR?</TACK>

In one embodiment, a monitor command contains a special termination character such as a "Carriage Return" in or a question mark "?". The receiver may also send a TACK signal to the device, which confirms receipt of a message. In some embodiments, the TACK signal will take a similar format:

<TACK></TACK>

The device may respond to the TACK with its own status acknowledgement, a ST_ACK. In some embodiments, the ST_ACK has the following format:

<STATUS>ST_ACK:06:20:27.500</STATUS> where the numbers 06:20:27.500 after the ST_ACK command comprise a time stamp.

While the language here is shown in a human-readable format (which may greatly enhance the ease which systems are debugged), in some embodiments it may be passed as encrypted data, so as to obscure the commands from outside eavesdropping. Upon being received, messages are decrypted to reveal the underlying tag/encapsulation structure.

Figure 4:
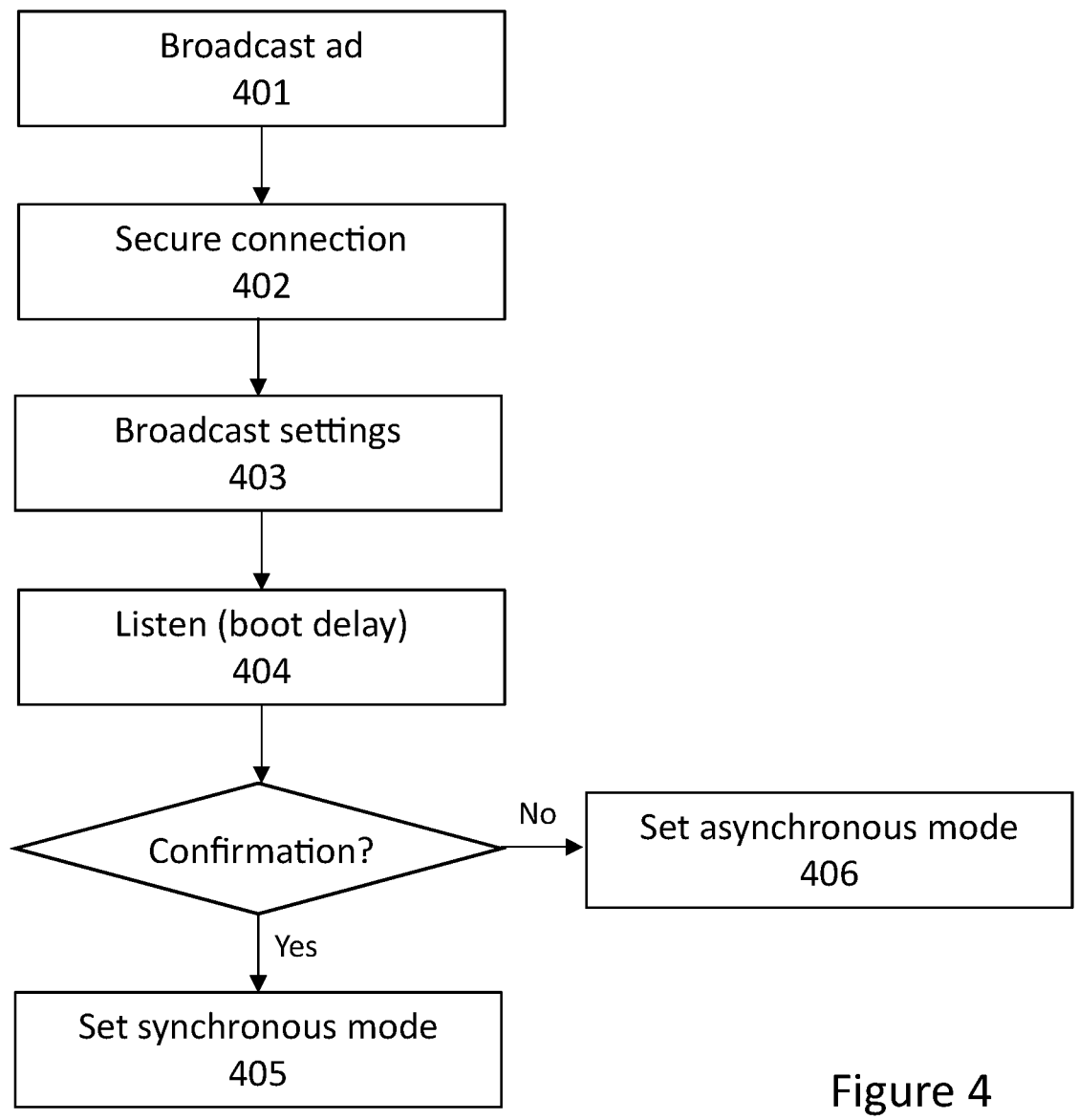
FIG. 4 illustrates a connection protocol from the perspective of a sensor.

To enable serial transfer of data between different modules, which may be configured for parallel data transmissions, an SDK or similar component may be provided for each communications module that forces the communication module to operate in a serial mode. FIG. 4 illustrates a process performed by exemplary communications SDK that may be established in a sensor device 20 for establishing a serial connection between the sensor device 20 and the receiver 30. See also FIG. 3A. In one embodiment, the sensor device 20 advertises 401 (e.g., emits a broadcast ad) its existence to the receiver 30 using any communications protocol standard, such as BLE, WiFi, Zigbee, etc. If the receiver 30 acknowledges the broadcast ad (e.g., the receiver executes a handshake with the broadcasting sensor device 20), a connection is secured 402 between the sensor device 20 and the receiver 30.

Once a connection is secured, the sensor device 20 broadcasts 403 its settings to the receiver 30. Such a broadcast may include identifying the channel (e.g., single channel) on which all communications will occur. The sensor device may then enter a enters listen mode 404 allowing both devise time to process the settings and prepare any infrastructure beyond the RF connection ready for transmission. In some embodiments, the length of time the device remains in listen mode is termed the 'boot delay'. The boot delay may be set by software, for example coded in a bootloader.

If the sensor device 20 receives a parsable signal, e.g., confirmation, in response to its settings broadcast within the boot delay, it enters synchronous mode 405 for its data connection. If no parsable signal is received in response within the boot delay, the device enters asynchronous mode 406 data connection. In some embodiments, advertisement 401 and listening 404 can be done simultaneously by both the sensor device 20 and the receiver 30, so that each is broadcasting and listening for the other, and a determination of which will formally become the receiver is made after the data connection is secured. Without limitation, in some embodiments the data connection is affected using a serial protocol such as Cable-Replacement Protocol. The protocol used for the data connection may be the same whether synchronous or asynchronous mode is selected.

The asynchronous mode represents a pure one-way communications mode, where one component broadcasts and the other receives, but no confirmations of receipt are sent. This mode of communication does not allow for many of the features of this disclosure, but may be preferred in a situation where, for example, two-way communication is unreliable due to high levels of interference. Synchronous mode refers to a mode where at least two components pass information back and forth between each other, and in particularly where a first component awaits a confirmation or response from a second component as part of its process flow. This arrangement allows for providing communications in either an asynchronous mode or a synchronous mode depending on the limitations or abilities of the system.

Figure 5:
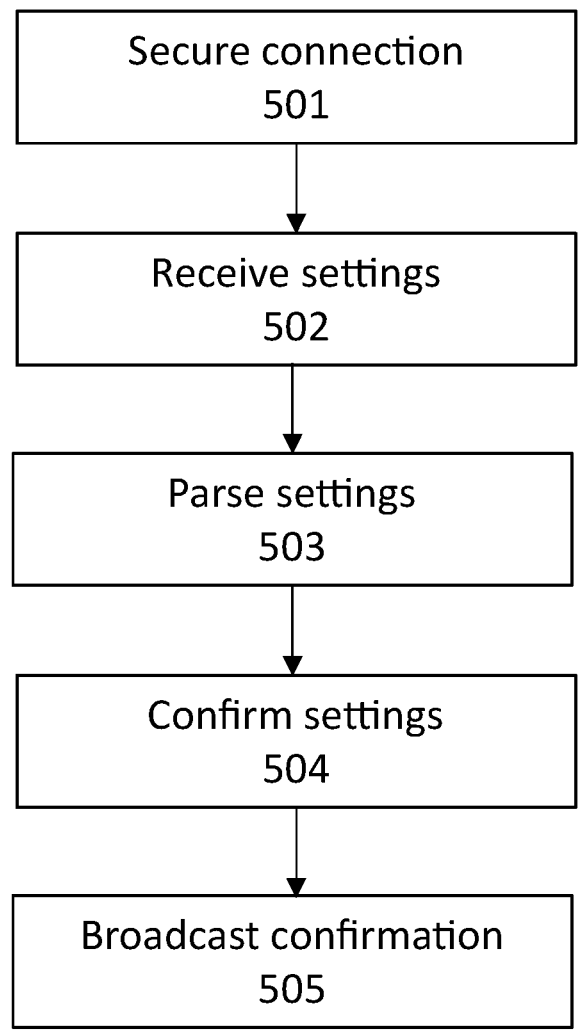
FIG. 5 illustrates a connection protocol from the perspective of a receiver.

FIG. 5 shows the communications from the perspective of a communications SDK of the receiver 30. Initially, the receiver 30 broadcasts 501 its existence and secures a physical connection by any protocol. The receiver 30 receives 502 the settings from the sensor device 20, parses 503 the setting to ensure they are correctly formatted, and then confirms in 404 that they are valid. The receiver then broadcasts its confirmation in 505. If that confirmation is received within the boot delay, the two devices will secure a data connection in synchronous mode.

Figure 6:
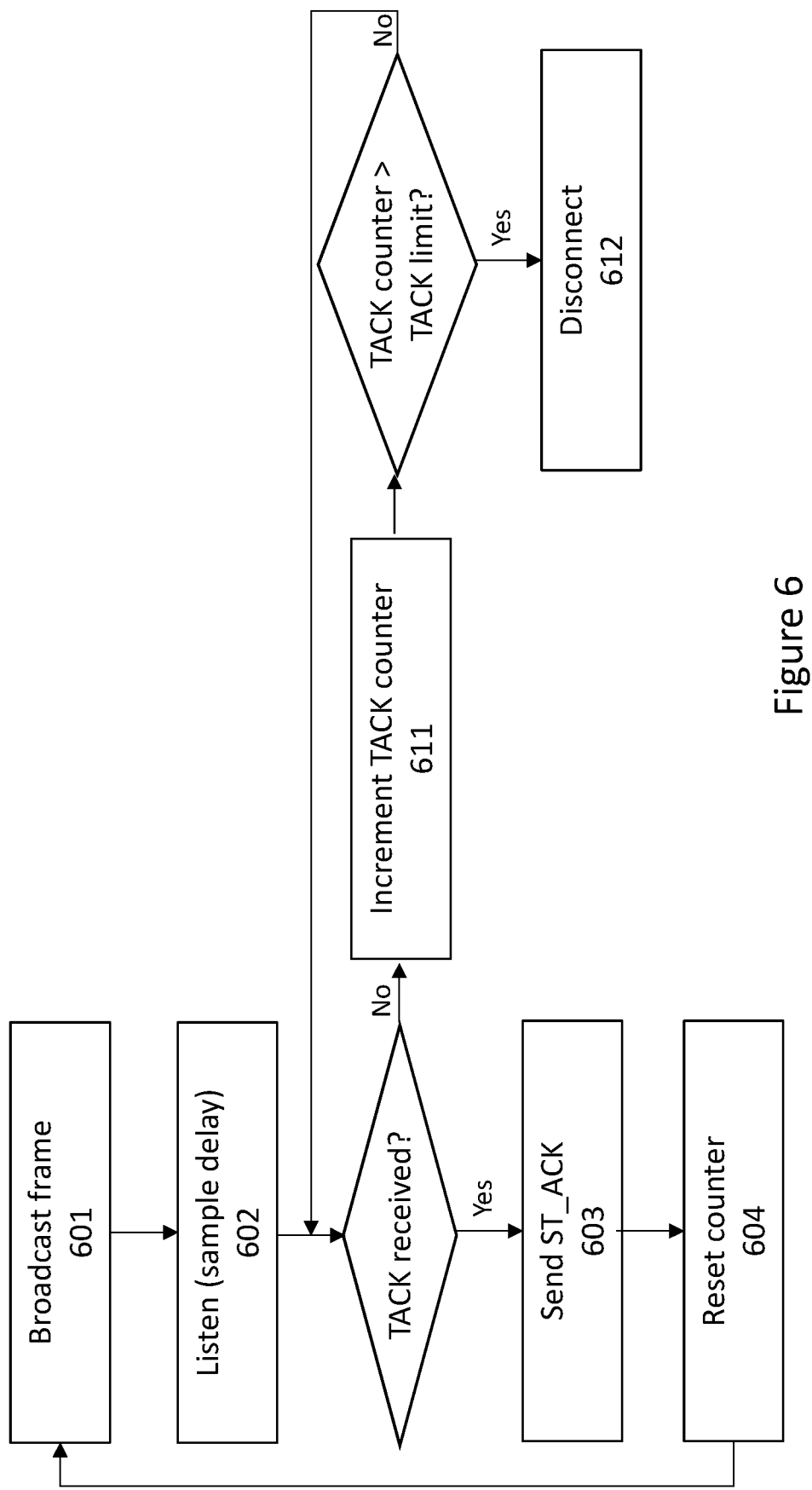
FIG. 6 illustrates a flow of communications in synchronous mode, from the perspective a sensor device.

FIG. 6 shows the flow of communication in synchronous mode, from the perspective of a communication SDK of the sensor device 20. The sensor device 20 broadcasts a frame in 601, then enters listen mode 602. During listen mode 602, the sensor device 20 awaits confirmation of reception by the receiver 30 in the form of a TACK. In one embodiment, the device maintains itself in listen mode for up to a period of time termed the sample delay. If no TACK is received 611, the sensor device 20 increments a TACK counter to catalog that the delay period has passed without confirmation of the message. In one embodiment, the TACK counter may be incremented up to a preset TACK limit, and if that TACK limit is met or exceeded, the device assumes that the connection has been lost, and will begin its disconnection protocol 612. The outlined process allows the sensor device 20 to, in the synchronous mode, confirm that transmissions are being received. By way of example, in a BLE operations mode, no confirmation is typically received by a sending unit. The outlined process may be in the form of an SDK or similar interface that allows confirming receipt of serial transmissions. If a receipt is confirmed (e.g., a TACK is received), data transmissions may continue. If receipt is not confirmed, the sensor device may revert to lower energy broadcast mode advertising its availability to send data. The process allows for reducing the energy requirements of the sensor device by disconnecting when no communication is received from the receiver.

In one embodiment, when the device receives a confirmation (e.g., TACK), it moves to the next step in the process flow. In another embodiment, the device waits for the full sample delay period before moving to the next step in the flow, even if a TACK has been received during this period. If the device does receive a TACK before the TACK counter meets or exceeds the TACK limit, the device may optionally broadcast a confirmation of reception termed a "ST_ACK" in 603 and resets the TACK counter in 604. Steps 603 and 604 may be optionally reversed in order. Without regard to the order with which delays are completed, ST_ACK is sent, or counters reset, the reception of the TACK allows the sensor device to repeat the process with a new frame when ready.

Figure 7:
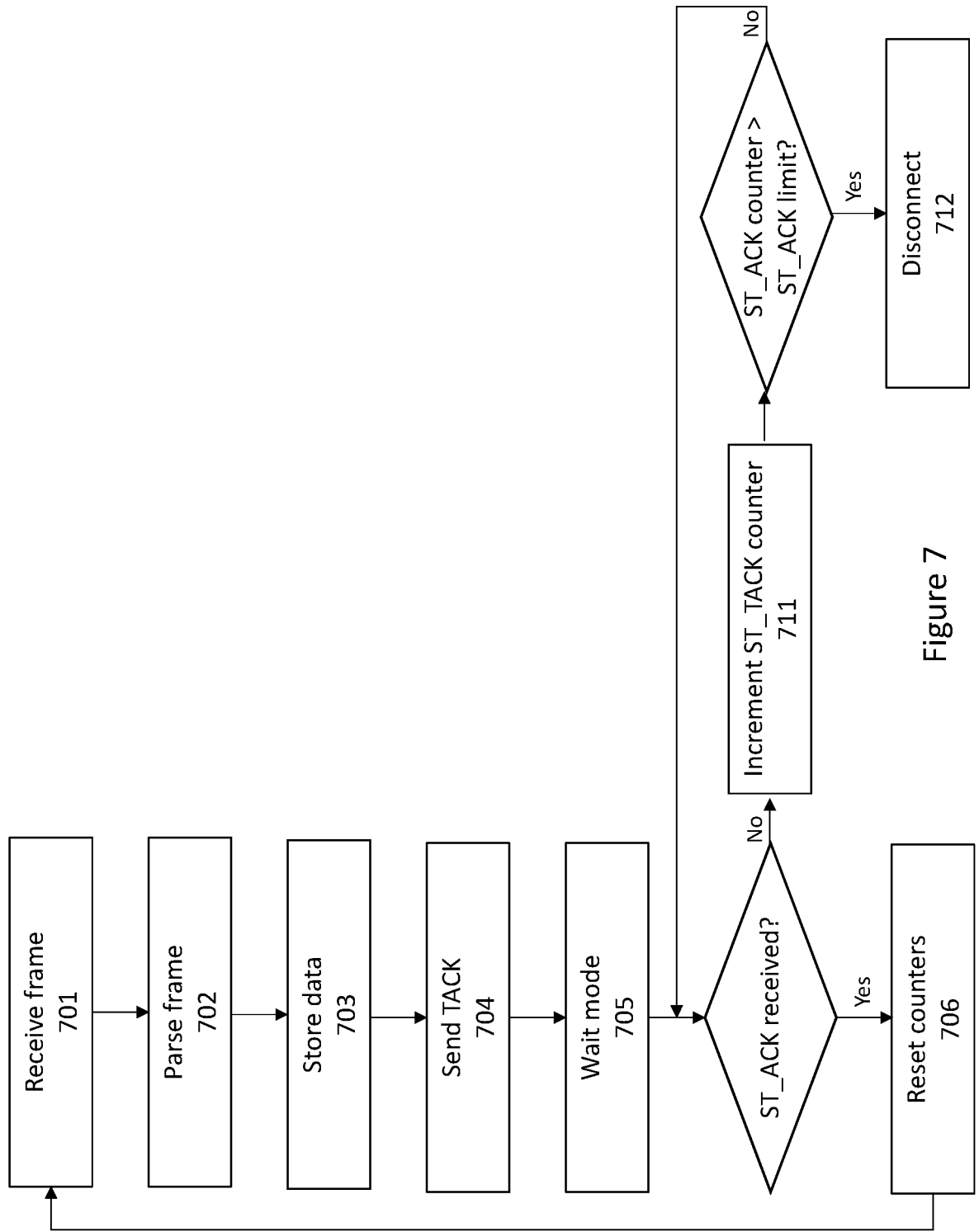
FIG. 7 illustrates a flow of communications in synchronous mode, from the perspective of the receiver.

FIG. 7 shows a process flow of communication in synchronous mode, from the perspective of the receiver. In one embodiment, when in synchronous mode, the receiver prepares to receive a frame in 701. In one embodiment, after receiving a frame the receiver moves to parse frame in 702 to ensure that it is parsable, and then stores the data in 703 contained in the frame. In one embodiment the data is stored in a location with a direct connection to the device. That is, the data is stored "locally." In another embodiment, the data is stored in a location remote from the device (stored "in the cloud").

In one embodiment, after parsing the data, the receiver transmits a TACK response 704. In one embodiment, steps 703 and 704 are transposed, so that the response is sent before the data is archived. In one embodiment, after sending the TACK response the receiver enters a wait mode 705, defined by a ST_ACK confirmation time. If, during that wait mode 705 the receiver receives a ST_ACK confirmation during the ST_ACK confirmation time and returns to receive frame mode. In one embodiment, if the receiver does not receive a ST_ACK within the ST_ACK confirmation time, the receiver updates a ST_ACK counter in 711. In this embodiment, as with the operation of the TACK counter, if a pre-set limit is met or exceeded the device is disconnected. If ST_ACK is received without exceeding the limit, the counter is reset, and the receiver re-enters receive mode for a fresh frame of data. In some embodiments, the TACK count limit is the same number as the ST_ACK count limit, but in other embodiments this is not the case, and the devices maintain independent counter limits.

In one example of the disconnect protocols, the device or receiver exit data transmission mode and resume ad broadcast or ad listen, respectively, to preserve energy. In another embodiment of the disconnect protocol, a device or receiver transmits a lost channel message and then resets itself. A sensor device may move from communication mode to a reception mode, or a receiver may move from communication mode to a listen mode.

Figure 8:
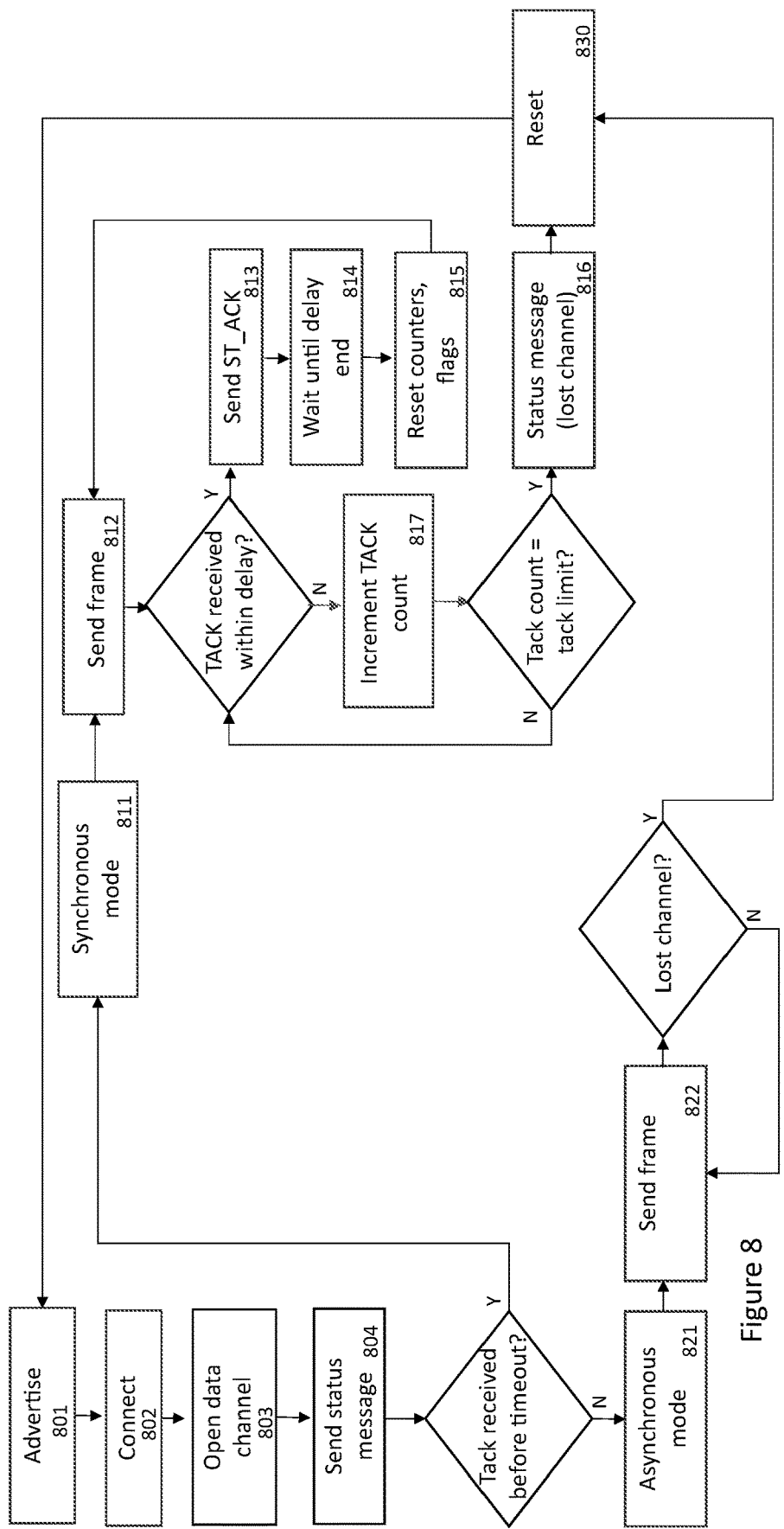
FIG. 8 illustrate an alternate connection protocol.

FIG. 8 shows an alternative method of device operation. A sensor device begins in advertise mode 801, and from there moves to physically connect to a receiver 1002 and open a data communication channel 803. These steps may be taken according to any protocol, including BLE, WiFi, etc. . . . . In this process, the device sends a status message 804 after a communications channel has been established, where the status method uses the IoTML formatting. The receiver is expected to respond with a TACK message, and if this TACK is received before a set timeout period, the device will enter synchronous mode 811. If the TACK does not return before a set timeout period, the device enters asynchronous mode 821.

In asynchronous mode 821, the device sends frames 822 according to its internal settings without receiving replies from the receiver. The device will maintain this behavior until the receiver drops the communication channel, at which point it will reset itself 830 and return to advertise mode 801.

In synchronous mode 811, a device sends a frame 812, and then waits to see whether a TACK is received within a preset delay period. If the TACK is received, then the device replies with a ST_ACK confirmation 813 and waits until delay end 814. In an alternative embodiment, the device waits until the delay and, and then replies with a ST_ACK confirmation. Inclusive of either method, the device then resets all internal counters and flags in that have changed since sending the frame (815), and then returns to send another frame 812.

If the device fails to receive a TACK within a designated delay period, the device increments a TACK counter 817. While the TACK count is less than a pre-defined TACK limit, the device returns to wait mode. However, if the TACK count equals the TACK limit, then the device broadcasts a status message confirming that it lost its channel 816 and resets itself 830 to return to advertising.

The serial communications between the IoT devices may permit the communication of the human readable markup language end-to-end in the IoT system. That is, the various modules (e.g., above the receiver) may utilize similar communication SDKs, when necessary, to effect serial communications. The use of a translating SDKs at each module in the system allows each module to convert the human readable markup language into a native format (e.g., machine language). Once converted to native format, the module may take actions as outlined in instructions or commands contained within communication. As discussed above, this may simply entail transferring data from sensors to the cloud. Alternatively, the communication may include commands that instruct operation of the various modules. For instance, these communications may include instruction used to dynamically control parameters in a device, a receiver, or elsewhere. In any case, the human readable markup language (e.g., IoTML) may be used from end to end in the IoT system providing a common control language throughout the IoT system. Such a common human readable language facilitates debugging of the system as well as simplifying the operation of the system as engineers of different disciplines may implement operations in the IoT system from, for example, the backend to the sensors (i.e., end-to-end) so long as each module in the IoT system can convert the human readable language to its native format.

In some embodiments, the human-readable mark-up language is only used in a specially designated debug mode. Under normal operation, a more compact form of information may optionally be transferred (e.g., standard communications). In the debug mode, human readable tags and metadata are used for information transfer. By way of example, a gateway or system controller may be instructed to communicate using the human-readable mark-up language in some or all of its communication through the setting of a flag that signals activation of a 'debug mode'. In such an embodiment, when debug mode is active, the system uses human-readable communication and is therefore less efficient than in normal mode. The system may revert to normal mode on resetting of the flag from a manual command, or the flag may automatically reset after a specified time-out period to ensure that high overhead communication does not continue indefinitely.

Figure 9:
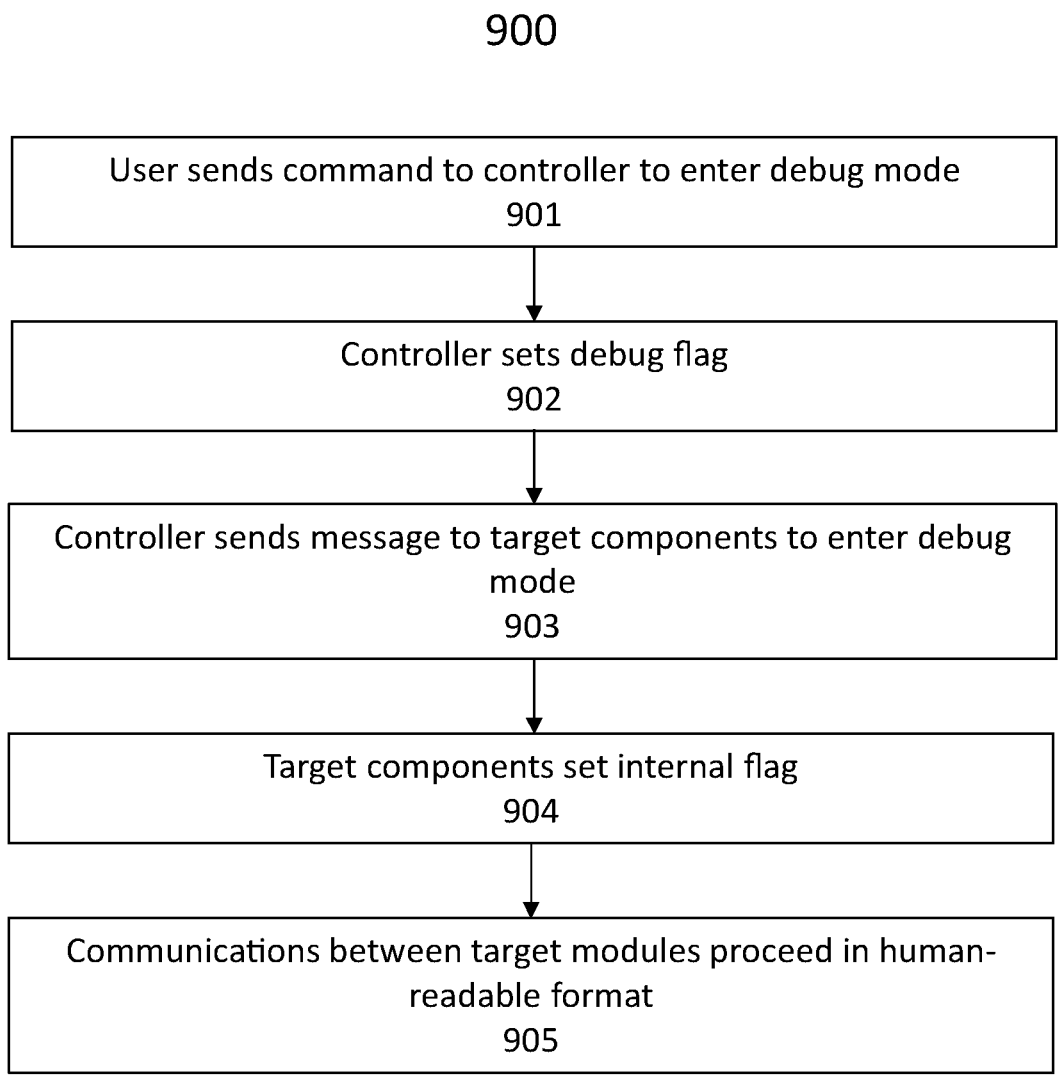
FIGS. 9-11 illustrate debugging protocols.

FIG. 9 shows an exemplary process 900 for a debugging mode. To enter debug mode, an engineer sends a command 901 to the system to controller 67 (See also FIG. 2) to set a flag 902 indicating debugging communications. The controller then sends a message 903 to the target modules to convert their communications to human-readable format. In one embodiment, the message goes to all target modules, including those in the cloud, gateways, and sensors, so that the entire system is communicating between modules in human-readable format. In some embodiments, the message from the controller goes to a subset of systems, as designated by an engineer or technician. For example, in some embodiments the message from the controller will instruct gateways and sensors in a particular region to switch to human-readable format, while leaving communications of other gateways and sensors in their natural, terser machine format.

Upon receiving the command from the controller, target modules set their own internal flags for debug mode 904, and then commence communicating in human-readable format 905. The communication in human-readable format may continue until the flag at the controller is manually reset, triggering an analogous flow of commands which resets the flags to machine-readable format. In some embodiments, the modules will automatically reset their flags and return to machine-readable communications after a specified time-out period. In some embodiments, the length of the specified time-out period is sent alongside the command to set flags. In some embodiments, a default length of the specified time-out period may be encoded in each module as part of installation of its translation SDK. In addition, each of the modules may store the communications to a log as discussed above.

Figure 10:
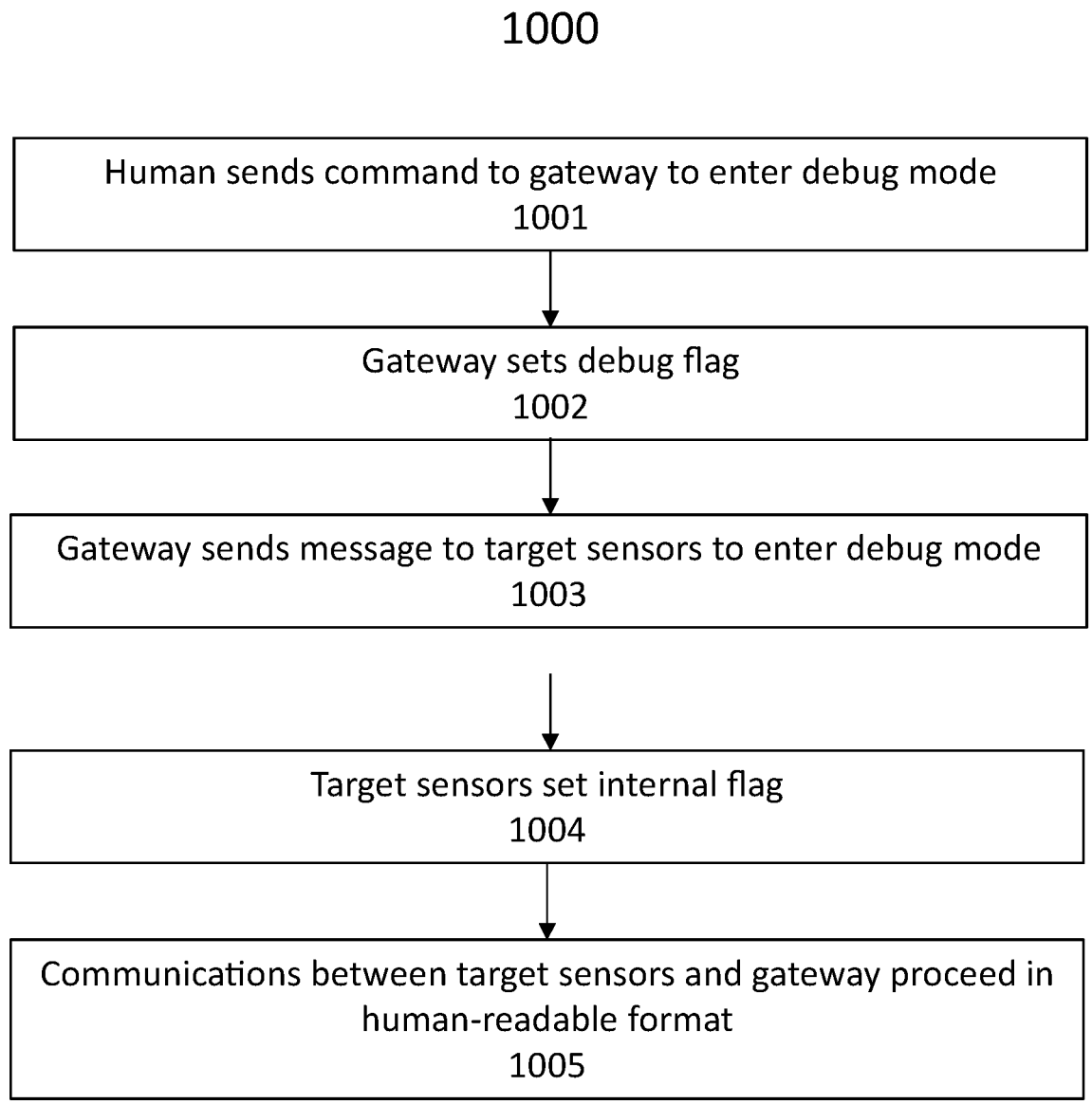

FIG. 10 shows another debugging process 1000. Initially, an engineer or technician sends 1001 a command to execute human-readable code directly to a gateway or set of gateways, rather than to the system controller. This process 1000 allows the engineer or technician to troubleshoot a local problem while allowing the rest of the system continue unaffected. After receiving the command, the local gateway(s) set 1002 their flag(s) for human-readable communication and message 1003 their associated sensor(s) to convert to human-readable communication. The sensors then set 1004 their flag(s) for human-readable communication and begin to transmit 1005 in this format. As above, a return to machine-readable code may be executed manually via an analogous flowchart (where 'set to human-readable' is replaced by 'set to normal'). The sensors and gateway may also automatically reset to machine-readable communication after a time-out period specified as part of the original commands or according to pre-installed instructions.

Figure 11:
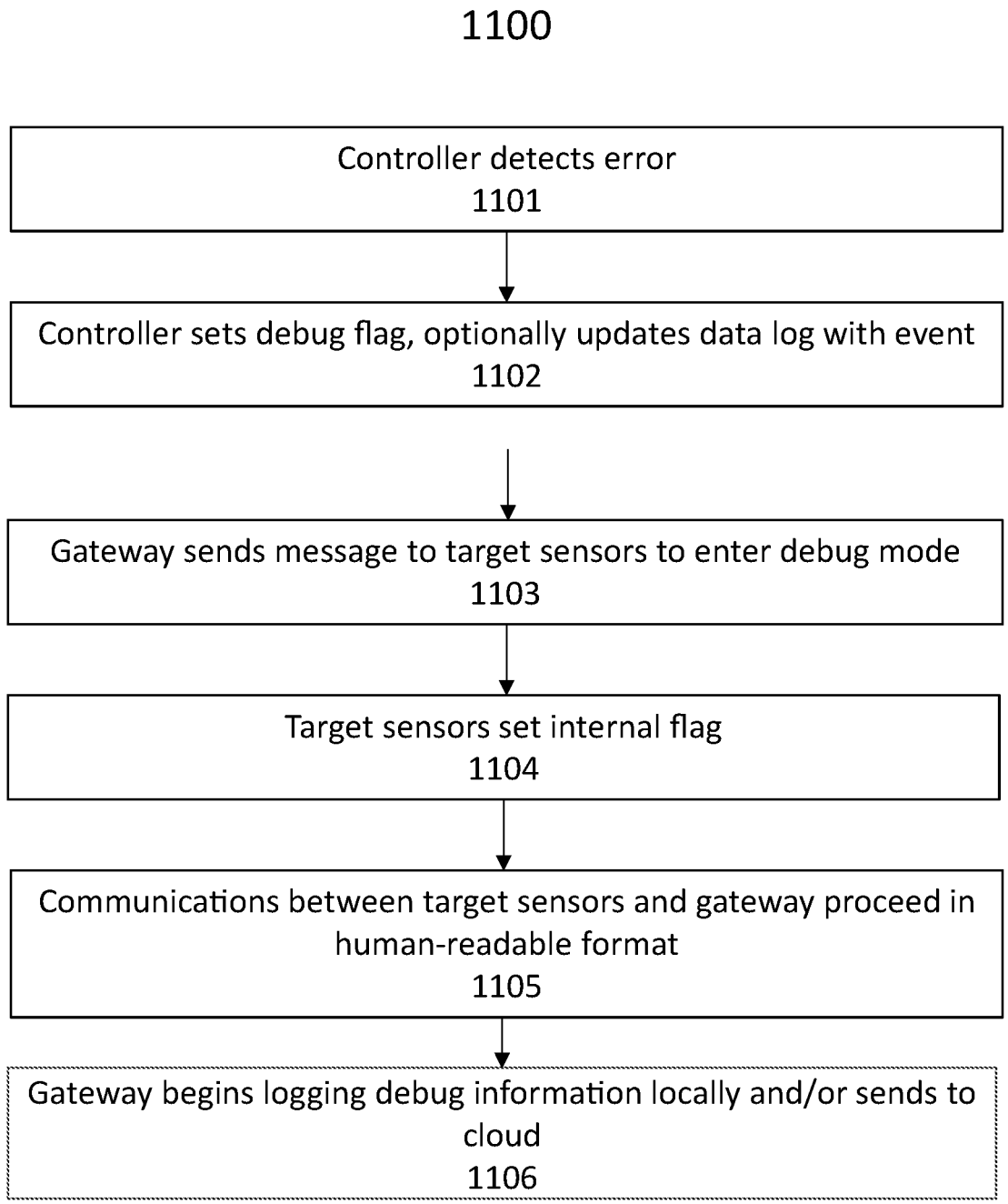

FIG. 11 illustrates another debugging process 1100. Initially, the controller 67 (See alto FIG. 2) detects 1101 an error condition (e.g., no data sent for a predetermined threshold of time, or data out of predefined range) using an automated error detection method such as anomaly detection. The automated anomaly detection method can include: Density-based techniques (k-nearest neighbor, etc.), subspace and correlation-based outlier detection, one-class support vector machines, replicator neural networks, Bayesian networks, hidden Markov models (HMMs), cluster analysis-based outlier detection, deviations from association rules and frequent item sets, fuzzy logic-based outlier detection, ensemble techniques, or any other method suitable for identifying an unexpected or anomalous state that may represent an error condition.

After detecting an error condition, the controller instructs the local gateway(s) to set 1102 their flag(s) for human-readable communication and optionally updates a debug log to note that the system has entered debug mode. The gateway(s) then message 1103 their associated sensor(s) to convert to human-readable communication. The sensors then set 1104 their flag(s) for human-readable communication and begin to transmit 1105 in this format. In one embodiment, the controller automatically sends a notification to an error notification system, for example via SMS, when it enters debug mode. A gateway or receiver may optionally log events 1106 after debug mode is triggered in a continual process, whether locally, by streaming back to the cloud, or a combination thereof. As above, a return to machine-readable code may be executed manually via an analogous flowchart (where the flags and settings return to their original state, setting the device back to machine-readable formats). The sensors, gateways/receivers and controller may also automatically reset to machine-readable communication after a time-out period specified as part of the original commands, or according to pre-installed instructions. In an alternate embodiment, a gateway/receiver may detect an error state, rather than a controller. The gateway then updates its error flag and instructs the system to enter debug mode, and optionally log the event and/or notify a notification system.

Using the communications methods described herein, control of various components of IoT system may be optimized for various devices in the IoT system. For example, a receiver can instruct through a command <CMD> transmission that it is not in need of specific data sets, and the device can then place some or all connected sensors into a sleep mode. Calculations needed for such a control system can be performed locally, or in the cloud. In particular, the power of analytics can be used to both determine (more) optimal settings, and to automate to analysis, automate the writing/compiling of software/firmware/protocols, deployment of a test to various devices, comparison of the results, and deployment to other devices. The changes made to the system (automated or not) can range from simple timing settings, through new drivers and new SDKs for component performance, to new communications standards/stacks/protocols, to new commands/functionality added to the IoTML—the entire system can be modified to improve or optimize a given function. Of course, resources outside the system per se—from real-time weather forecasts to new SDKs, to Machine Learning algorithms—can be used in this optimization. In all cases, some aspect of the performance of the device such as net data transmission rate, net energy consumption, energy consumed per bit set, etc. can be optimized by adding the additional overhead associated with the tagged and encapsulated commands shown in this invention.

Figure 12:
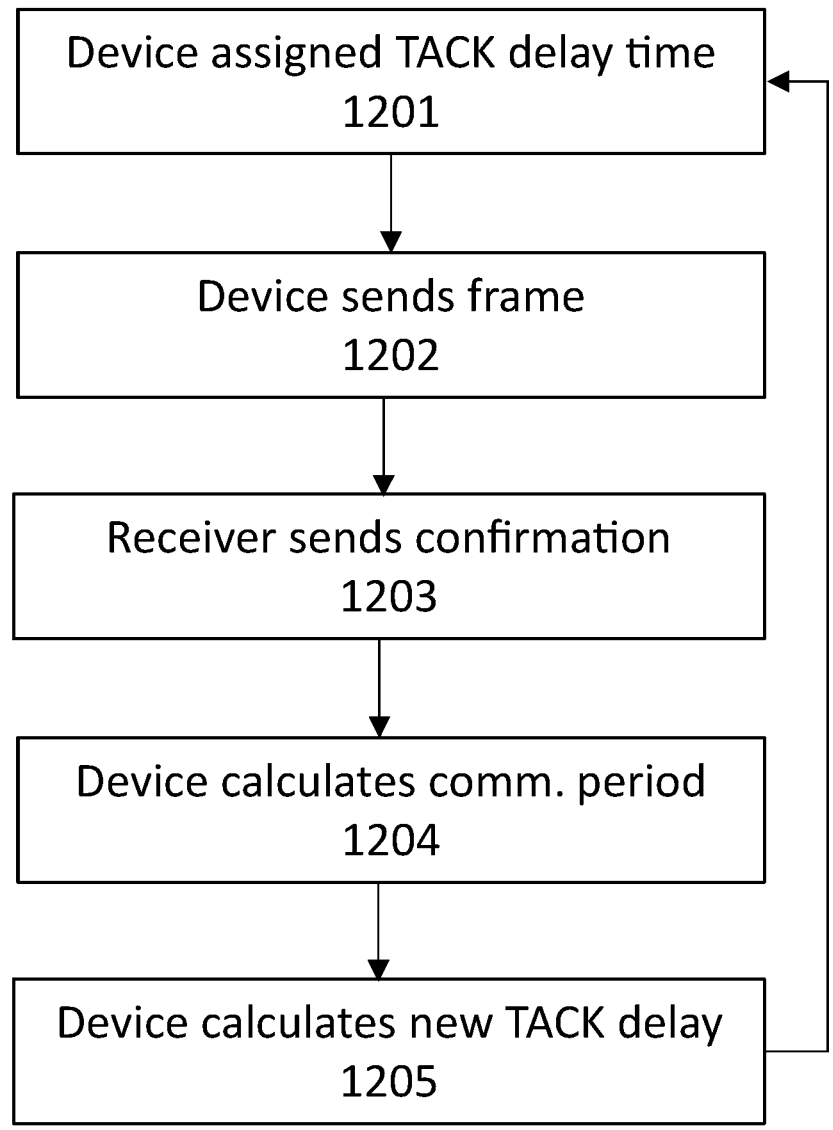
FIG. 12 illustrates a process flow for altering the speed of communications in an IoT system.

In one embodiment, the communications methods set forth above may be used to dynamically control parameters in device, receiver, or elsewhere. For instance, the speed of communications may be optimized using information contained in this communications method, as shown in FIG. 12. In a first step 1201, a device is assigned a first TACK delay time, which controls the time period in between frame transmissions. The device then sends a first frame of data 1202, and after receiving TACK confirmation 1203 the device calculates the current period for round-trip communication 1204. The device then recalculates the wait time 1205 using at least the new communications delay as an input to the calculation. For example, in one embodiment the device sets the TACK delay as the communications delay. In another embodiment, the device sets the TACK delay using the Additive Increase Multiplicative Decrease (AIMD) algorithm. The revised and updated TACK delay is the used in future communication. Using the method described here, the communications speed can be optimized for the real conditions a device is in, rather than using a pre-set value.

Figure 13:
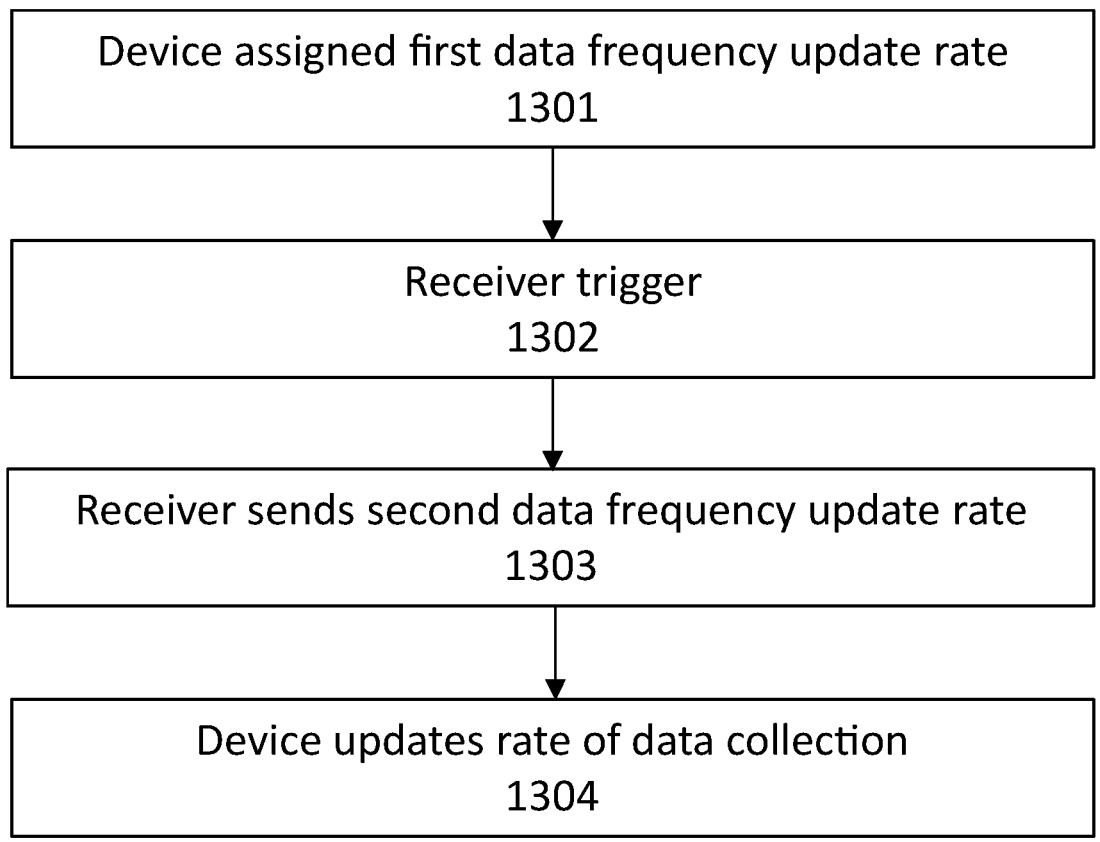
FIG. 13 illustrate a process flow for altering the resolution of a sensor device in an IoT system.

FIG. 13 shows an example of the use of the communications methods in a control system to optimize data resolution of a weather measurement sensor. In this example, a sensor measuring weather conditions might be set to a first data frequency update rate 1301 suitable for normal weather. However, upon a triggering event 1302 the receiver may send a command to the sensor 1303 to update the frequency of data collection, for example increasing the frequency of data collection 1304. In this way, the energy consumption of the sensor may be optimized so as to expend minimal energy during normal weather conditions but allowed to consume higher energy by making more finely resolved measurements during more extreme weather conditions. Alternatively, a first set of data (e.g., temperature, wind, humidity) may be sent according to a first set of instructions, but a second set of data (e.g., temperature, wind, pressure) may be set according to a second set of instructions. In such cases, the specific data selected may be optimized to meet the criteria required by the receiver, or by a broader system that may be controlled remotely, for example in the cloud.

Figure 14:
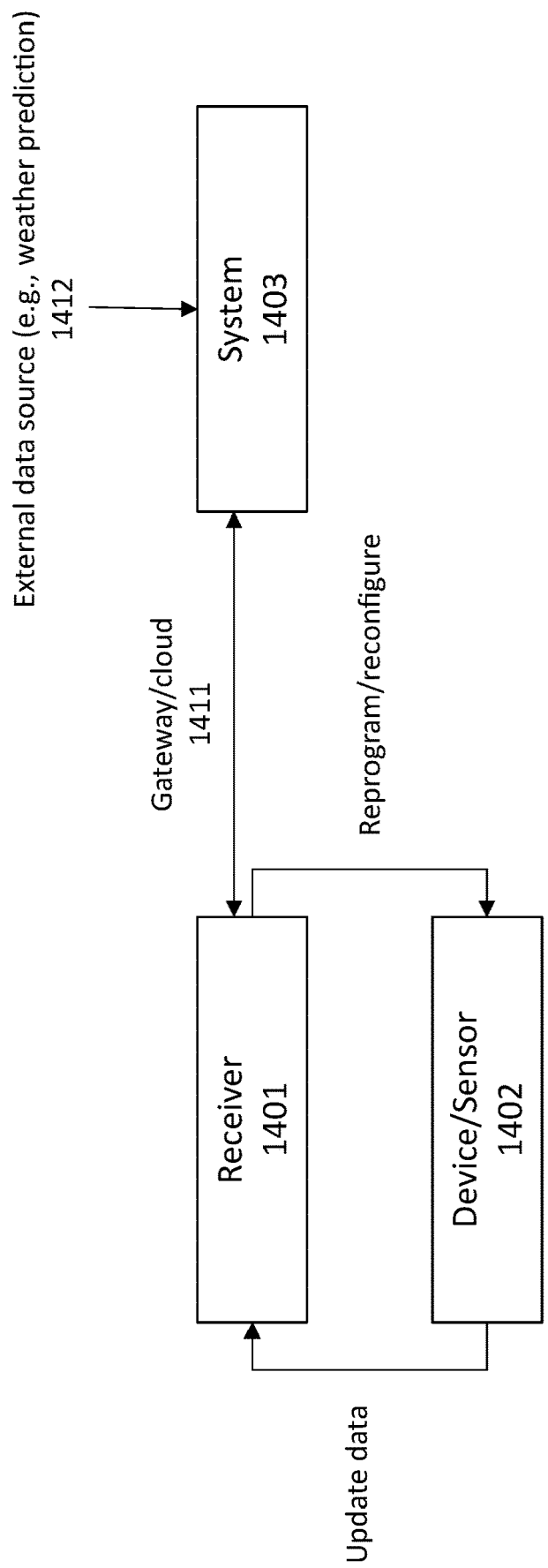
FIG. 14 illustrates a process for altering operation of the system based on a triggering event.

A triggering event may include a direct measurement such as a change in temperature, pressure, wind speeds, etc., or an indirect measurement comprising a combination of such data or may comprise data exogenous to the sensor system such as a forecast from the National Weather Service. An example controls system is shown in FIG. 14, comprising a receiver 1401 in communication with a sensor 1402. The receiver may also be in communications with a system 1403 via a gateway 1411. In one embodiment, the gateway 1411 comprises an LTE mobile phone connection. In one embodiment, the system comprises storage and/or computational capabilities located in 'the cloud'. In one embodiment, the system has access to exogenous (non-local) information 1412, such as a weather prediction, and that weather prediction information is used to calculate a revised instruction set for the sensor. The revised instruction set is sent from the system to receiver, and then from the receiver to sensor, to effectively allow the system to control the sensor operating parameters.

Figure 15:
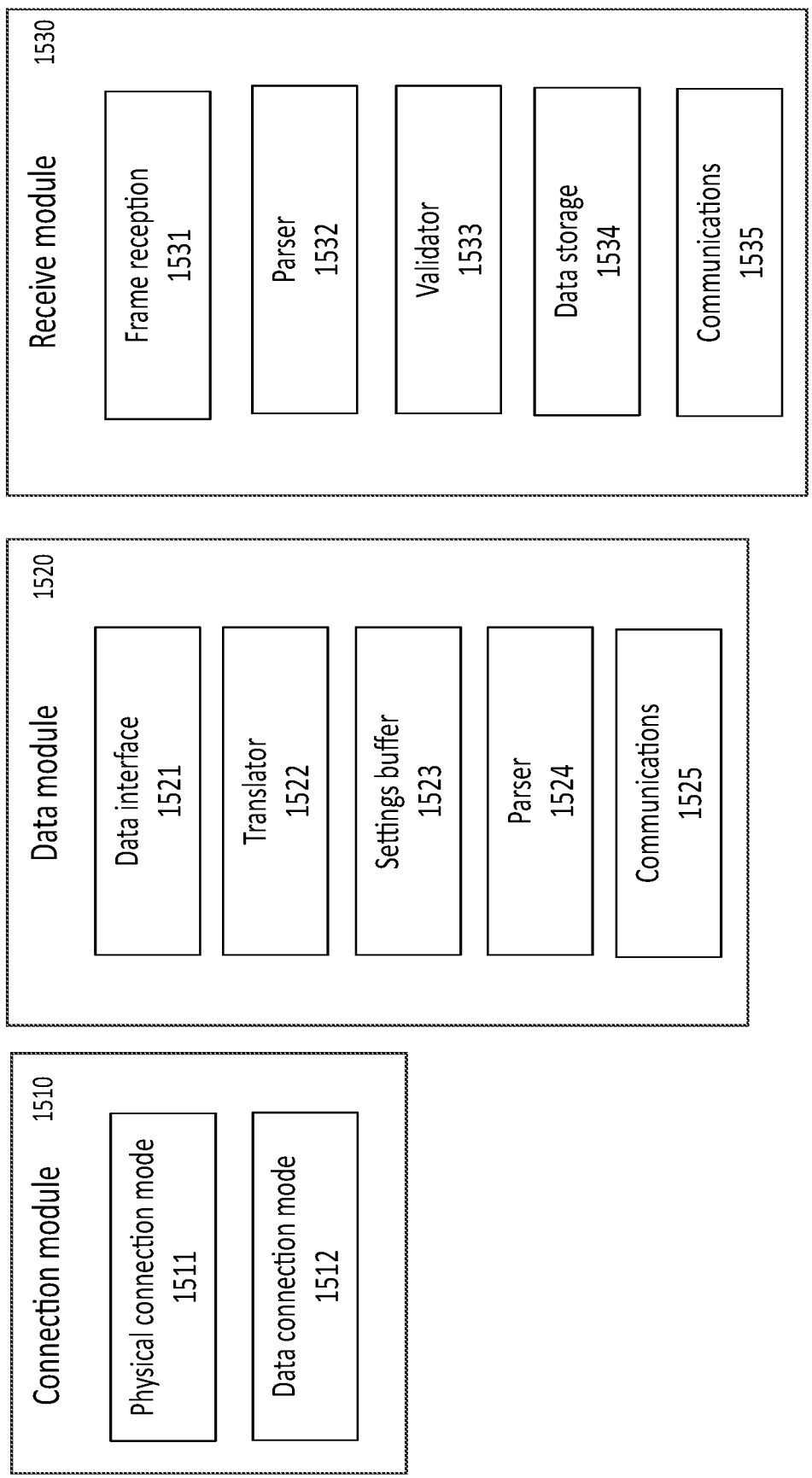
FIG. 15 shows an alternative embodiment of a system for communication between components of the system.

FIG. 15 shows an alternative embodiment of a system for communication between components of the system. In this embodiment, a system component (e.g., sensor device) invention comprises a connection module 1510 and a data module 1520 that communicates with response module 1530 (e.g., of a receiver or gateway). The connection module comprises two modes, the physical connection mode 1511 wherein a communications link between devices is established, and a data connection mode 1512 wherein the system is set to communicate using the methods of this invention. The connection module 1510 may be used by a device or receiver.

The data module 1520 is operated by the device and comprises a data interface 1521; a translator 1522 to translate commands from the human readable mark-up language to the native language of the device; a buffer 1523 to hold the settings/other communicated from device to receiver or receiver to device; a parser 1524 to break a frame into discrete instructions; and a communicator to pass back and forth data frames and confirmations. The receive module 1530 comprises a mode for receiving frames 1531; for parsing those frames 1532; for confirming the validity of the parsed frames 1533; for storing data elements contained in those frames 1534; and for communicating 1535 back to the device, including TACK commands.

In one embodiment, the back end of the communication systems is IoTML enabled, and so can be used to perform automated unit and systems testing by passing testing commands from back-end to controller to sensor throughout the system. In one embodiment, the backend or an individual controller may query for and receive systems' health information from components further down the chain. In another embodiment, firmware/software updates may be pushed from the backend through the system. In one embodiment, the automated system directly changes firmware or software on target devices to a test configuration. In another embodiment, the system health requests and updates are centrally controlled by the backend. In this embodiment, the backend monitors the system, and either repairs or optimizes its performance. These operations might be accomplished using applications, expert system(s), analytics, or AI. In this process, a human being may or may not supervise or intervene.

By way of example, the backend might receive (or request and then receive) system health reports about a malfunctioning sensor on a particular device, and then send system configuration settings to the device instructing it to stop sending that information. In another example, the backend might, after examining the values coming from a sensor, decide it is out of calibration, and send new calibration settings to the device. In another example, the backend might similarly decide (using analytics, system health information, or both) that a given sensor had a malfunctioning/corrupted driver and send (via for example a firmware update) a replacement driver to the device. In another example, the backend might send a firmware that allows for the backend to run testing protocols for the device or send firmware devices to a portion of a fleet of similar devices so that it can perform testing to determine which version of firmware is most efficient for power use or data rates. In another example, the backend and analytics might write (or compile from libraries) new firmware code that fixes issues or optimizes devices, and/or does comparisons to learn how to better write/compile such code. In another example, the same might be done for electronics design. In another example, the backend might use analytics, systems health information, or both, to adjust configurations, calibrations, and firmware/software to globally optimize the system for operating costs, or to repurpose the fleet to make new types of measurements (or sensor-fusion information). In another example, the backend can carry out and manage secure operations, from simple authentication to (analytics assisted) identification of intrusion in any system component.

Using the human readable protocols, IoTML components can be programmed, provisioned, tested, calibrated, and debugged along the assembly line process, be "born" having successfully connected to a system that gathers information (such as MAC addresses, manufacturing run, automated calibration information, etc.), and be configured to connect to the correct customer's backend, and/or receive automated system updates, configurations, etc. on first connection. In one embodiment the MCU is programmed at the manufacturer with a bootloader (or other firmware) that allows it to connect to the system when power is first applied to the device it is part of. In another embodiment, the device is designed with a "monitor" input/output channel directly connected with any MCUs such that it is possible to debug that component directly using IoTML. In another embodiment, the monitor connection can directly provide power for the device (or subsections thereof), in order to allow for 1) QC earlier in the manufacturing process (e.g. before power cables or expensive components are attached, 2) debug when a communication channel (say a BLE module) does not function properly, or 3) a common factory debug connector.

Calibration is an important manufacturing process for instrumentation. In one embodiment, sensor data is sent to the backend, where the data is processed to provide calibration coefficients (or information) that are returned and written to firmware or memory of the devices. In another embodiment, sensor data is compared with other sensors or field observations processed to provide calibration coefficients that are returned and written to the devices' firmware or memory. In another embodiment the calibration information resides in the backend and measurements are calibrated as they arrive at the backend. In another embodiment, a monitor cable is used to sample sensor or to return calibration information to the device.

The various operations of methods and functions of certain system components described above can be performed by any suitable means capable of performing the corresponding functions. These means can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application-specific controllers.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer-readable, tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A method for debugging an internet of things (IoT) system including multiple system modules, comprising:

issuing a start command to at least a portion of the system modules to enter a debug mode, wherein the portion of the system modules commence communication in a mark-up language having tags and data:

acquiring an output from a first module and encapsulating the output in the mark-up language having tags and data to define encapsulated data at the first module;

first communicating the encapsulated data to a second module via a wireless connection between the first module and the second module;

generating, at the first module, a first log file of the encapsulated data, as sent from the first module to the second module, wherein the first log file is in the mark-up language;

receiving, via the wireless connection, the encapsulated data at the second module and generating a second log file of the encapsulated data as received by the second module from the first module, wherein the second log file is in the mark-up language; and comparing the first log file and the second log file to identify if differences exist between the between the first log file and the second log file, issuing a stop command to the portion of the system modules to exit the debug mode, wherein subsequent communications are free of the mark-up language.

2. The method of claim 1, wherein in the debug mode, the first communicating is performed in a serial data transfer between the first module and the second module.

3. The method of claim 2, wherein out of the debug mode, communications between the first and second module include parallel or packetized data transfer.

4. The method of claim 1, further comprising:

second communicating the encapsulated data received by the second module to a third module; and generating a third log file of the encapsulated data as received by the third module from the second module, wherein the third log file is in the mark-up language.

5. The method of claim 4, further comprising:

comparing the first log file, the second log file and the third log file to identify if differences exist between the between any of the first log file, the second log file and the third log file.

6. The method of claim 1, wherein the first communication occurs as a serial data transfer on a single channel of a parallel communications protocol.

7. The method of claim 1, wherein encapsulating the output comprises:

translating between a native machine language of the first sensor device and the mark-up language based on instructions stored on the first module.

8. The method of claim 7, where the instructions comprise a Software Developer's Kit (SDK) specifically configured for the first module.

9. The method of claim 1, wherein the mark-up language includes human readable tags.

10. The method of claim 1, wherein a controller in the system issues the start command to the portion of the system modules to enter the debug mode upon detecting an error condition.

11. A method for debugging an internet of things (IoT) system including multiple system modules, comprising:

detecting an error condition in the system;

issuing a debug start command to at least a portion of the system modules, wherein the portion of the system modules to switch from machine-readable communications to mark-up language communications, wherein the mark-up language communications are in a mark-up language having tags and data;

communicating first data from a first system module to a second system module in the mark-up language and via a wireless connection between the first system module and the second system module;

generating, at the first system module, a first log file of the first data, as sent from the first system module to the second system module, wherein the first log file is in the mark-up language;

generating, at the second system module, a second log file of the first data as received by the second module from the first module, wherein the second log file is in the mark-up language; and comparing the first log file and the second log file to identify if differences exist between the between the first log file and the second log file; and reverting to machine-readable communications after one of a predetermine time and a debug end command.

12. The method of claim 11, wherein the first log file and the second log file are in the mark-up language and have human readable tags.

13. The method of claim 11, wherein mark-up language communications between the first system module and the second system module are performed in a serial data transfer.

14. The method of claim 11, wherein machine-readable communications between the first system module and the second system module are performed in parallel or packetized data transfer.

15. The method of claim 11, wherein comparing the first log file and the second log file comprises:

acquiring the first log file from the first system module;

acquiring the second log file from the second system device.

16. The method of claim 15, wherein the first log file is stored at the first system module and the second log file is stored at the second system module.

17. The method of claim 15, wherein at least one of the first log file and the second log file is acquired via a connection other than the wireless connection between the first system module and the second system module.

* * * * *